(12) United States Patent
Vogel et al.

(10) Patent No.: US 9,842,100 B2
(45) Date of Patent: Dec. 12, 2017

(54) FUNCTIONAL ONTOLOGY MACHINE-BASED NARRATIVE INTERPRETER

(71) Applicant: TripleDip, LLC, San Francisco, CA (US)

(72) Inventors: Claude Vogel, Key West, FL (US);
Susan Decker, San Francisco, CA (US)

(73) Assignee: TRIPLEDIP, LLC, San Francisco, CA (US)

( * ) Notice: Subject to any disclaimer, the term of this patent is extended or adjusted under 35 U.S.C. 154(b) by 0 days.

(21) Appl. No.: 15/081,590

(22) Filed: Mar. 25, 2016

(65) Prior Publication Data

US 2017/0277676 A1    Sep. 28, 2017

(51) Int. Cl.
G06F 17/27    (2006.01)
G06F 17/21    (2006.01)
G06N 5/02    (2006.01)

(52) U.S. Cl.
CPC .......... *G06F 17/271* (2013.01); *G06F 17/274* (2013.01); *G06F 17/277* (2013.01); *G06F 17/2775* (2013.01); *G06N 5/02* (2013.01)

(58) Field of Classification Search
CPC .... G06F 17/271; G06F 17/274; G06F 17/277; G06F 17/2775; G06N 5/02
USPC .................... 704/9, 232, 259, 266
See application file for complete search history.

(56) References Cited

U.S. PATENT DOCUMENTS

| 5,963,965 | A | 10/1999 | Vogel |
| 6,665,681 | B1 | 12/2003 | Vogel |
| 7,113,954 | B2 | 9/2006 | Vogel |
| 8,166,032 | B2 | 4/2012 | Sommer et al. |
| 8,280,827 | B2 | 10/2012 | Muller et al. |
| 8,280,885 | B2 | 10/2012 | Cardie et al. |
| 8,327,265 | B1 | 12/2012 | Vogel |
| 2004/0148155 | A1 | 7/2004 | Vogel |
| 2004/0220893 | A1 | 11/2004 | Spivack et al. |
| 2005/0086218 | A1 | 4/2005 | Auspitz et al. |
| 2009/0119157 | A1 | 5/2009 | Dulepet |
| 2009/0276426 | A1 | 11/2009 | Liachenko et al. |
| 2009/0282019 | A1 | 11/2009 | Galitsky et al. |

(Continued)

OTHER PUBLICATIONS

Anderson et al., "Logic, Meaning and Computation" Dec. 2001—Essays in Memory of Alonzo Church, Second Order Logic, pp. 61-75.

(Continued)

*Primary Examiner* — Thierry L Pham
(74) *Attorney, Agent, or Firm* — DLA Piper LLP (US)

(57) ABSTRACT

A system and method for analyzing narrative data based on a functional ontology using semiotic square functions to produce analyzed data outputs. A computer implemented method accesses narrative data and reads a semiotic square function data table for each verb in the sequence of words, each semiotic square function data table classifies at least one verb in each sentence pattern as a functional type and includes one or more words in a semiotic square relationship to the verb classified, the functional type applying at least one symmetrical relationship between a first actor and a second actor in the narrative data. The method parses each sentence which includes a verb matching a functional type to match sentence subjects and objects to an event template and outputs an analysis of the narrative data relative to a common story theme based on a sequence of event records.

20 Claims, 28 Drawing Sheets

(56) References Cited

U.S. PATENT DOCUMENTS

2012/0265745 A1  10/2012  Vogel
2014/0108006 A1   4/2014  Vogel et al.

OTHER PUBLICATIONS

Wiederhold, "Binding in Information Processing", May 1981, Report No. STAN-CS-81-851.
Wikipedia, Unification (Computer Science), retrieved on Jun. 22, 2015: https://en.wikipedia.org/wiki/Unification_(Computer_science).
Wikipedia, Optimal Matching, retrieved on Feb. 25, 2015: https://en.wikipedia.org/w/index.php?title=Optimal_matching&oldid=648812540.
Colombo, et al., *Semantics in Visual Information Retrieval*, IEEE, 1999, pp. 38-53 (16 pgs.).
Colombo, et al., *Retrieval of Commercials by Semantic Content: The Semiotic Perspective*, Multimedia Tools and Applications, 13, 2001, pp. 93-118 (26 pgs.).
Gudwin, et al., *Computational Semiotics: An Approach for the Study of Intelligent Systems—Part 1: Foundations*, Technical Report RT-DCA 09—DCA-FEEC-UNICAMP, 1997 (24 pgs.).

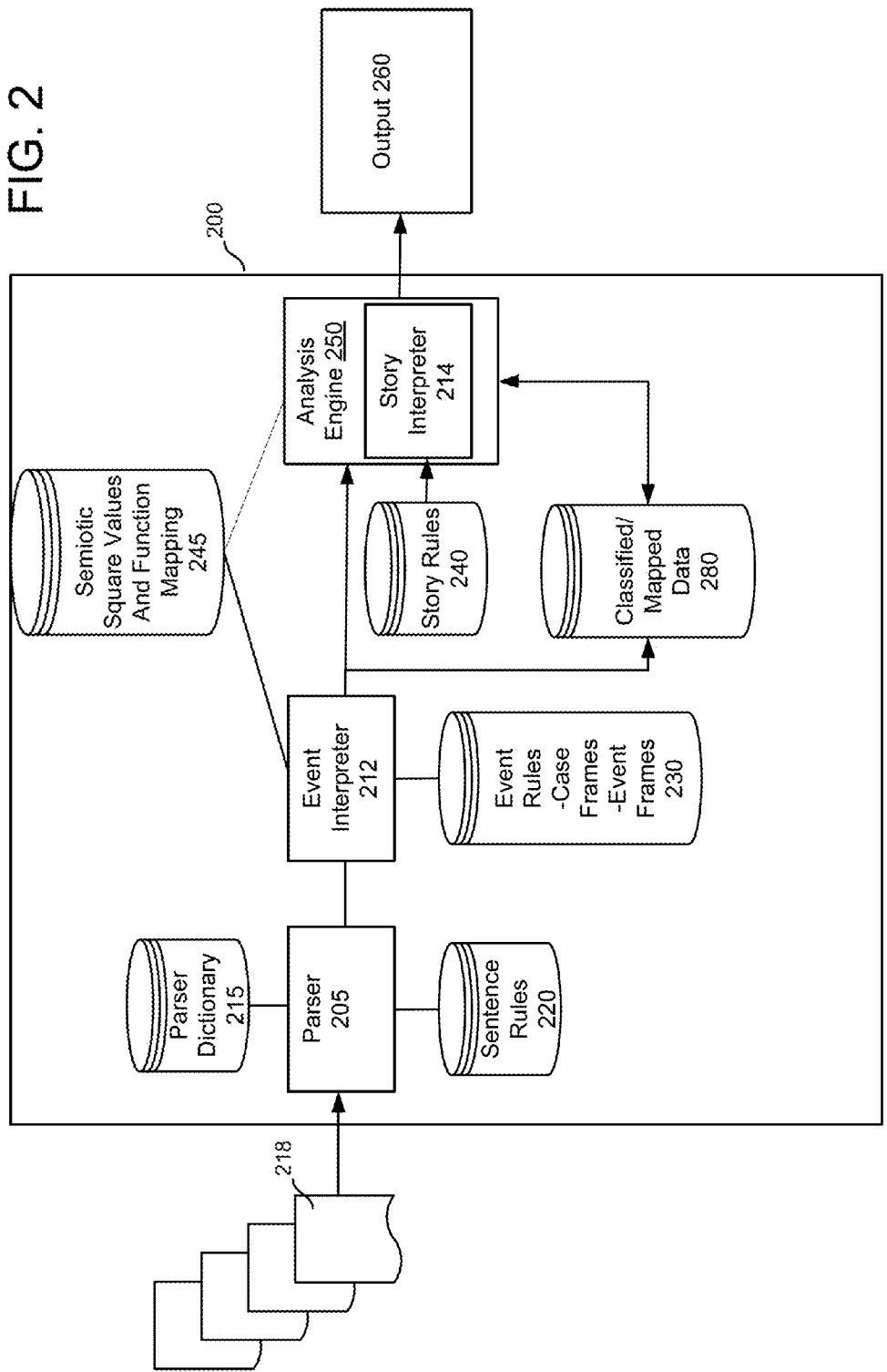

FIG. 12

| Facet / TRANS | MTRANSFER | MTRANSFER-L | MTRANSFER-A | MTRANSFER-H |
|---|---|---|---|---|
| Knowledge Transfer | EXPLAIN | COMPLICATE | CONFUSE | |
| Knowledge Transfer | ADVISE | | | |
| Knowledge Transfer | ASSUME | REJECT | DENY | SUPPORT |
| Knowledge Transfer | ORGANIZE | CLUTTER | DISORGANIZE | |
| Knowledge Transfer | ASSESS | MISUNDERSTAND | MISREPRESENT | |
| Knowledge Transfer | PREDICT | | | |
| Knowledge Transfer | LEARN | FORGET | | |
| Knowledge Transfer | TRAIN | | | |
| Knowledge Transfer | REMEMBER | | | |
| Knowledge Transfer | SEARCH | | HIDE | |
| Knowledge Transfer | FIND | | | |
| Knowledge Transfer | NOTICE | IGNORE | SNEAK | |
| Knowledge Transfer | CREATE | | PLAGIARIZE | INNOVATE |
| Knowledge Transfer | | | | FANTASIZE |
| Knowledge Transfer | PUBLISH | UNPUBLISH | DIVULGE | EXPOSE |
| Knowledge Transfer | WRITE | | | |
| Knowledge Transfer | INTRIGUE | BORE | | FASCINATE |
| Knowledge Transfer | INSPIRE | UNINSPIRE | SCORN | MENTOR |
| | | | | FASCINATE |
| | | | | SEDUCE |
| | | | | PROSELYTIZE |

FIG. 13

| Facet / TRANS | ETRANSFER | ETRANSFER-L | ETRANSFER-A | ETRANSFER-H |
|---|---|---|---|---|
| Composure Transfer | SLAKE | AGITATE | ANTAGONIZE | TRANQUILIZE |
| Composure Transfer | | ALARM | TERRORIZE | REASSURE |
| Composure Transfer | | DEPRESS | DEMORALIZE | ENCOURAGE |
| Composure Transfer | | | BRAG | HUMBLE |
| Pleasure Transfer | AMUSE | SADDEN | BOTHER | INDULGE |
| Desire Transfer | LIKE | DISLIKE | RESENT | LOVE |
| | | | SULK | CRAVE |

FIG. 14

| Facet / TRANS | PTRANSFER | PTRANSFER-L | PTRANSFER-A | PTRANSFER-H |
|---|---|---|---|---|
| Location Transfer | MOVE | REST | STOP | SPRINT |

FIG. 15

| Facet / TRANS | XTRANSFER | XTRANSFER-L | XTRANSFER-A | XTRANSFER-H |
|---|---|---|---|---|
| Integrity Transfer | LIBERATE | CAPTURE | PERSECUTE | EMANCIPATE |
| Integrity Transfer | | | ABUSE | |
| Integrity Transfer | | | COERCE | |
| Integrity Transfer | | | ABDUCT | |
| Integrity Transfer | | | MURDER | |
| Contention Transfer | ATTACK | SUFFER | WITHDRAW | ALLY |
| Contention Transfer | DEFEND | | | |
| Contention Transfer | RETALIATE | | | |

FIG. 16

| Facet / TRANS | ATRANSACT | ATRANSACT-L | ATRANSACT-A | ATRANSACT-H |
|---|---|---|---|---|
| Legal Transaction | DEAL | DISAGREE | FOIL | AGREE |
| Legal Transaction | MARRY | DIVORCE | PHILANDER | |
| Legal Transaction | CLAIM | RETRACT | REFUTE | CORROBORATE |
| Legal Transaction | DESERVE | | | |
| Trust Transfer | TRUST | DISTRUST | DECEIVE | BELIEVE |
| Trust Transfer | | | | REHABILITATE |
| Trust Transfer | | | BETRAY | |

FIG. 17

| Facet / TRANS | MTRANSACT | MTRANSACT-L | MTRANSACT-A | MTRANSACT-H |
|---|---|---|---|---|
| Knowledge Transaction | COMMUNICATE | SEGREGATE | OSTRACIZE | FRATERNIZE |
| Knowledge Transaction | NEGOTIATE | | | |
| Knowledge Transaction | COLLABORATE | DISUNITE | INTRUDE | |
| Knowledge Transaction | LEAD | FOLLOW | | |

FIG. 18

| Facet / TRANS | XTRANSACT | XTRANSACT-L | XTRANSACT-A | XTRANSACT-H |
|---|---|---|---|---|
| Contention Transaction | FIGHT | ELUDE | DESERT | CRUSADE |
| | | | | BRAVE |
| | | | | SACRIFICE |
| Contention Transaction | COMPETE | | | |
| Quality Transaction | COMPARE | | RIVAL | |
| Game Transaction | BANTER | | | |

FIG. 25A

Rabbits have overrun the gated Orange County community, and Jeana's son Shane has gained the reputation as the official "rabbit hunter." Jeana decides it's the perfect time to take her kids on a vacation to Mexico, where Shane finds romance. Kimberly is feeling neighborhood pressure to upgrade her car, and decides to go shopping for something more pricey and suitable for the prying eyes of the Orange County community. Meanwhile, Jo's fiance Slade plans a high-powered business meeting with a potential client, Brent, which makes Jo miss her career. He plots a "chance encounter" with Brent in their neighborhood. Jo continues her quest to accept her life of leisure by taking a tennis lesson with Kimberly. Vicki takes Briana and a group of cheerleaders on a cruise, where Vicki's wild side emerges. Upon their return, Vicki worries about money, argues with Michael about getting a job, and fears that her employee Lauri isn't going to work out. Lauri's troubles continue to mount. Her son, Josh, gets into big trouble at school and gets arrested. Lauri has to break the news to her youngest daughter, Sophie. Lauri looks forward to her work convention with Vicki, unaware that Vicki is contemplating firing her.

FIG. 25B

"doc_id" : "55ff3955866a6f3648ca4799",
    "text" : "Lauri's troubles continue to mount",
    "episode_id" : "2",
    "summary" : "Rabbits have overrun the gated Orange County community, and Jeana's son Shane has gained the reputation as the official \"rabbit hunter.\" Jeana decides it's the perfect time to take her kids on a vacation to Mexico, where Shane finds romance. Kimberly is feeling neighborhood pressure to upgrade her car, and decides to go shopping for something more pricey and suitable for the prying eyes of the Orange County community. Meanwhile, Jo's fiance Slade plans a high-powered business meeting with a potential client, Brent, which makes Jo miss her career. He plots a \"chance encounter\" with Brent in their neighborhood. Jo continues her quest to accept her life of leisure by taking a tennis lesson with Kimberly. Vicki takes Briana and a group of cheerleaders on a cruise, where Vicki's wild side emerges. Upon their return, Vicki worries about money, argues with Michael about getting a job, and fears that her employee Lauri isn't going to work out. Lauri's troubles continue to mount. Her son, Josh, gets into big trouble at school and gets arrested. Lauri has to break the news to her youngest daughter, Sophie. Lauri looks forward to her work convention with Vicki, unaware that Vicki is contemplating firing her.",

FIG. 28

"doc_id" : "55ff3959866a6f3648ca47cb",
    "text" : "Lauri gets a ring",
    "episode_id" : "9",
    "summary" : "Jo gets dumped by her boyfriend Slade. Lauri gets a ring. Lauri's son Josh moves into the town house next season but \"breaks house rules\" and is kicked out and then moved into Lauri's new husband's ex-wife's house.",

```
> db.series_events.find().skip(1).limit(5)
{
    "_id" : ObjectId("5605ea9c866a6t30a0082175f"),
    "season_id" : "21",
    "protagonists" : [
        "laud_waring_peterson"
    ],
    "series" : "RHOC",
    "year" : "2007",
    "event_id" : "230",
    "events" : [
        {
            "type" : "noun_phrase",
            "gram_function" : "Subject",
            "protagonists" : [
                "laud_waring_peterson"
            ],
            "sequence" : [
                {
                    "type" : "NP",
                    "tokens" : [
                        {
                            "token" : "Lauri",
                            "pos" : [
                                "NP0",
                                "FNG",
                                "CST",
                                "NNP",
                                "UPC"
                            ]
                        }
                    ],
                    "head" : {
                        "type" : "person",
                        "s" : "Lauri"
                    }
                }
            ]
        },
        {
            "type" : "copula",
            "trace" : "HASPRP",
            "head" : {
                "xlem" : "has_prp",
                "s" : "get"
            },
            "theme" : null,
            "time" : {
                "tense" : "present",
                "voice" : "active"
            }
        },
        {
            "type" : "noun_phrase",
            "gram_function" : "Object",
            "sequence" : [
                {
                    "type" : "NP",
                    "tokens" : [
                        {
                            "token" : "a",
                            "pos" : [
                                "AT0",
                                "ZZ0"
                            ]
                        },
                        {
                            "token" : "ring",
                            "pos" : [
                                "NN1"
                            ]
                        }
                    ],
                    "head" : {
                        "type" : "common",
                        "s" : "ring"
                    }
                }
            ]
        },
        {
            "type" : "pun",
            "token" : ".",
            "pos" : [
                "PUL",
                "PUN"
            ]
        }
    ]
}
```

FIG. 30

```
{
    "season_id" : 1,
    "episode_id" : 2,
    "text" : "Lauri's troubles continue to mount",
    "doc_id" : "5605ea77866a6f30a00820a2",
    "event_id" : 19,
    "year" : 2006
},
.....
{
    "season_id" : 2,
    "episode_id" : 9,
    "text" : "Lauri gets a ring",
    "doc_id" : "5605ea9c866a6f30a0082175",
    "event_id" : 230,
    "year" : 2007
},
],
"protagonist" : "lauri waring peterson"
}
>
```

FIG. 31 vicki timeline= {'events': [{'year': 2015, 'season_id': 10, 'doc_id': '55fde35682437e28c090839d', 'episode_id': 10, 'event_id': 1308, 'text': "Hung-over from a night of drinking, Vicki and Shannon deepen their friendship by discussing the details of David's affair"}
{'year': 2015, 'season_id': 10, 'doc_id': '55fde35c82437e28c09083c2', 'episode_id': 9, 'event_id': 1345, 'text': "Later, the group splits up for dinner leaving Shannon, Vicki and Tamra to not only take numerous shots at the bar, but also a few shots at Heather and Meghan's friendship"}
{'year': 2015, 'season_id': 10, 'doc_id': '55fde35b82437e28c09083bf', 'episode_id': 8, 'event_id': 1342, 'text': "Later, the women head off for a tropical get away to French Polynesia, but the road to paradise gets bumpy when Meghan and Vicki don't see eye to eye"}
{'year': 2015, 'season_id': 10, 'doc_id': '55fde35a82437e28c09083b8', 'episode_id': 7, 'event_id': 1335, 'text': 'Vicki enlists the powers of a medium to try and communicate with her mother'}
{'year': 2015, 'season_id': 10, 'doc_id': '55fde35a82437e28c09083b5', 'episode_id': 6, 'event_id': 1332, 'text': 'While Vicki travels to Chicago to mourn, Tamra heads north to celebrate the birth of her granddaughter'}
{'year': 2015, 'season_id': 10, 'doc_id': '55fde35a82437e28c09083b4', 'episode_id': 6, 'event_id': 1331, 'text': "Vicki's mother's passing has sent shock waves throughout the OC, causing the women all to take a deeper look at their family lives"}
=====

FIG. 32

```
> db.series_ontology.find().limit(5)
{
    "_id" : ObjectId("5605e3e7866a6f31a4700af3"),
    "isa" : "protagonist",
    "series" : "RHOC",
    "rel_to" : [
        {
            "rel" : "ex husband",
            "value" : [
                "tammy"
            ]
        }
    ],
    "type" : "person",
    "title" : "Lou Knickerbocker",
    "names" : [
        "lou knickerbocker",
        "lou"
    ],
    "disambiguation" : [
        "lou"
    ],
    "map_title" : "lou knickerbocker",
    "image" : {
        "img" : "http://www.tripledip.com.thumbnails.s3.amazonaws.com/cast/55f2de1caef7245185f80020.jpeg",
        "text" : "Lou Knickerbocker"
    }
}
```

FIG. 33

3410 {
freqs= {'deceive_': 3, 'disorganize_': 1, 'echo_': 1, 'create_': 14, 'XTRANSFER-L': 15, 'chase_': 8, 'support_': 14, 'shout_': 2, 'lean_': 1, 'improve_': 1, 'foil_': 2, 'flow_': 1, 'explain_': 14, 'linger_': 2, 'brag_': 2, 'explode_': 1, 'MTRANSACT-A': 1, 'like_': 13, 'die_': 1, 'pack_': 5, 'give_': 36, 'disentitle_': 6, 'jump_':6, ... 'disagree_': 15, 'imprint_': 2, 'write_': 2, 'endure_': 4, 'intrigue_': 1, 'ATRANSACT-L': 17, 'ATRANSACT-H': 5, 'notice_':13
}

...
...

'disentitle_,ATRANSFER': 1,
'disentitle_,ATRANSFER-L': 2,
'disentitle_,coerce_': 1,
'disentitle_,continue_': 1,
'disentitle_,disentitle_': 2,
'disentitle_,DO': 1,
'disentitle_,embellish_': 1,
'disentitle_,ETRANSFER-H': 1,
'disentitle_,express_': 1,
'disentitle_,increase_': 1,
'disentitle_,interact_': 1,
'disentitle_,mature_': 1,
'disentitle_,MK': 1,
'disentitle_,MKH': 3,
'disentitle_,MTRANSACT': 1,
'disentitle_,rent_': 1,
'disentitle_,sit_': 1,
'disentitle_,XTRANSFER-A': 1,
....

3420 {
'disagree_,agree_': 1,
'disagree_,ATRANSACT': 1,
'disagree_,ATRANSACT-H': 1,
'disagree_,ATRANSFER': 1,
'disagree_,begin_': 1,
'disagree_,deal_': 1,
'disagree_,DO': 3,
'disagree_,dominate_': 1,
'disagree_,embellish_': 1,
'disagree_,hold_': 2,
'disagree_,improvise_': 1,
'disagree_,interrupt_': 1,
'disagree_,MK': 1,
'disagree_,MKH': 1,
'disagree_,MKL': 2,
'disagree_,MTRANSFER': 1,
'disagree_,MTRANSFER-A': 1,
'disagree_,notice_': 1,
'disagree_,permit_': 1,
'disagree_,tear_': 1,
}

FIG. 34

```
{
    "_id" : ObjectId("560c3b7882437e157c9df560"),
    "post" : [
        {
            "ncooc" : 1,
            "icooc" : 40,
            "fn" : "supply_"
        },
        {
            "ncooc" : 1,
            "icooc" : 26,
            "fn" : "XTRANSFER"
        },
        {
            "ncooc" : 1,
            "icooc" : 26,
            "fn" : "create_"
        },
        {
            "ncooc" : 1,
            "icooc" : 100,
            "fn" : "liberate_"
        },
        {
            "ncooc" : 1,
            "icooc" : 13,
            "fn" : "hold_"
        },
        {
            "ncooc" : 1,
            "icooc" : 19,
            "fn" : "demoralize_"
        },
        {
            "ncooc" : 1,
            "icooc" : 14,
            "fn" : "ETRANSFER-A"
        },
        {
            "ncooc" : 1,
            "icooc" : 7,
            "fn" : "ATRANSFER"
        },
        {
            "ncooc" : 1,
            "icooc" : 7,
            "fn" : "MTRANSFER"
        }
    ],
    "fn" : "touch_"
}
```

FIG. 35

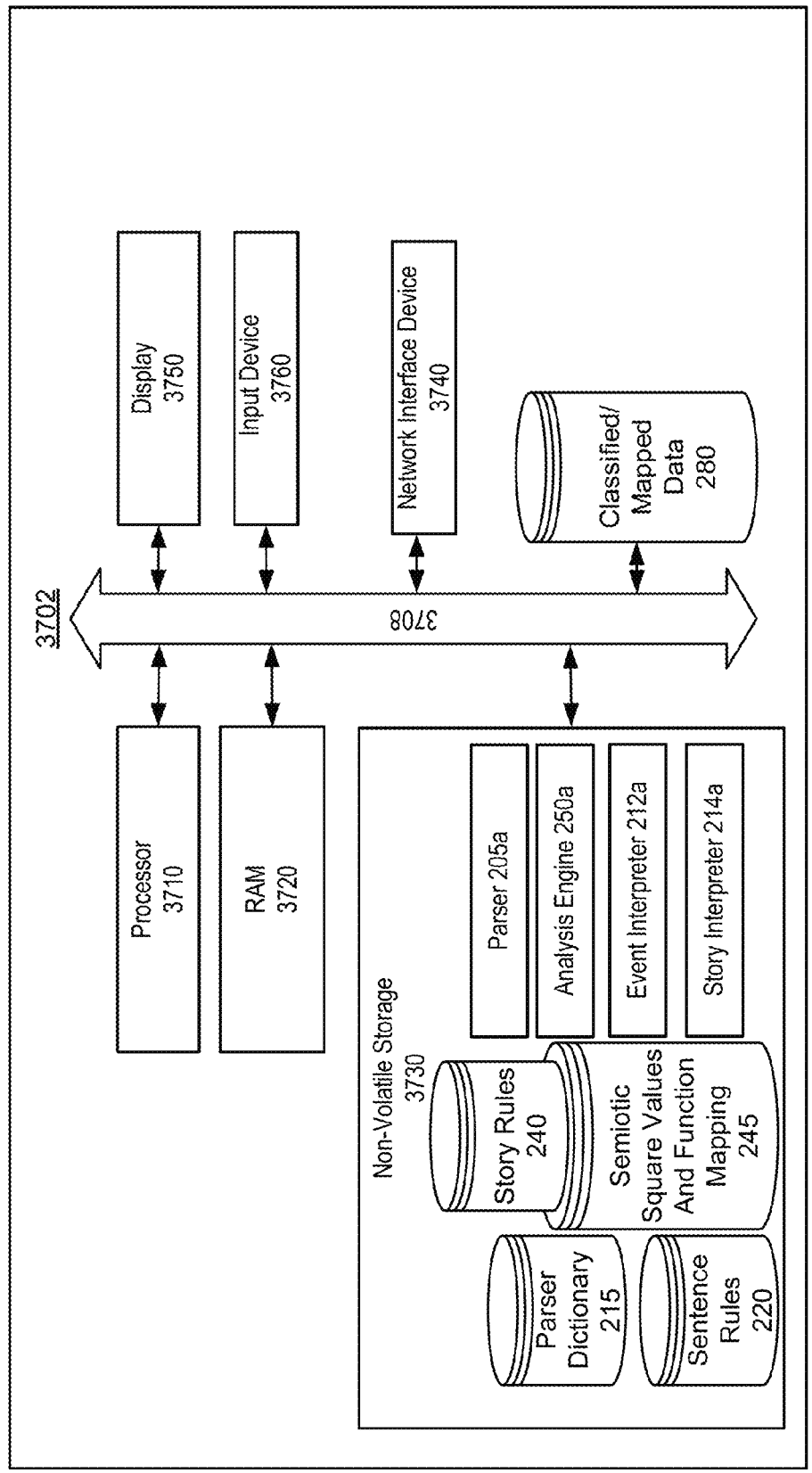

FUNCTIONAL ONTOLOGY MACHINE-BASED NARRATIVE INTERPRETER

BACKGROUND

Narratives may comprise written accounts of connected events. A story may include a narrative, actors or characters, and descriptive elements. Written stories are a primary way that many people consume news and entertainment. Many stories have a dynamic quality in that the story may change over time. News stories are updated as new related events occur, requiring news providers to gather new information, generate new text, and update any previous version of the story or author a completely new story.

Many people consume news stories in electronic form on various types of user devices. There is therefore a large availability of electronic narrative data which can be processed by computing devices. Because of the large amount of information available via public and private networks in electronic form, processing such data becomes increasingly difficult.

Linguistic computing presents a number of challenges in terms of defining relationships between complex story events.

SUMMARY

The technology, briefly described, comprises a system and method for analyzing narrative data based on a functional ontology using semiotic square functions to produce analyzed data outputs. Various types of analysis are provided. The technology takes the form of a computer implemented method, a computing system and/or code configured to instruct a computing system to perform a plurality of computing steps to produce an analysis of input narrative data. The technology may include a computer implemented method which accesses narrative data, the narrative data comprising a sequence of words arranged in sentence patterns. The method reads a semiotic square function data table for each verb in the sequence of words, each semiotic square function data table classifies at least one verb in each sentence pattern as a functional type and includes one or more words in a semiotic square relationship to the verb classified, the functional type applying at least one symmetrical relationship between a first actor and a second actor in the narrative data. The method parses each sentence which includes a verb matching a functional type to match sentence subjects and objects to an event template and stores data from each subject and object in a sentence as an event record. The method outputs an analysis of the narrative data relative to a common story theme based on a sequence of event records. The analysis may be a timeline of events, a prediction of next events and/or a comparison of similarity to other stories.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2 is a computing system environment suitable for implementing the technology for narrative interpretation discussed herein.

FIG. 12 is a table illustrating a semiotic square reflected in data structure for a series of mental transfer functions.

FIG. 13 is a table illustrating a semiotic square reflected in data structure for a series of emotional transfer functions.

FIG. 14 is a table illustrating a semiotic square reflected in data structure for a series of physical transfer functions.

FIG. 15 is a table illustrating a semiotic square reflected in data structure for a series of conflict transfer functions.

FIG. 16 is a table illustrating a semiotic square reflected in data structure for a series of abstract transactions.

FIG. 17 is a table illustrating semiotic square reflected in data structure for a series of mental transactions FIG. 18 is a table illustrating a semiotic square reflected in data structure for a series of conflict transactions.

FIG. 25A illustrates a computer generated summary of a television program with emphasis on a sentence whose structure is exemplified in the data structures shown herein.

FIG. 25B illustrates a data structure encapsulating the summary of FIG. 25A.

FIG. 26 illustrates a first portion of a data structure utilized in accordance with the teachings herein to store a characterization of the sentence of FIG. 25A.

FIG. 27 illustrates a second portion of a data structure utilized in accordance with the teachings herein to store a characterization of the sentence of FIG. 25A.

FIG. 28 illustrates the data structure of FIG. 25B used to store a different sentence and different summary.

FIG. 29 illustrates a first portion of a data structure utilized in accordance with the teachings herein to store a characterization of the sentence of FIG. 28.

FIG. 30 illustrates a second portion of a data structure utilized in accordance with the teachings herein to store a characterization of the sentence of FIG. 28.

FIG. 31 illustrates a data structure referencing event data structures and which may be used in the creation of a time line.

FIG. 32 illustrates a partial data structure storing an event time line for a given character protagonist in a story.

FIG. 33 illustrates a data structure storing the ontology of the present technology to characterize a protagonist.

FIG. 34 illustrates a partial data structure storing a frequency breakdown of a story for use in clustering prediction.

FIG. 35 illustrates a partial data structure storing a frequency analysis for clustering prediction in accordance with the present subject matter.

FIG. 36 is an illustration of an exemplary computing system suitable for implementing in the computing systems discussed herein.

DETAILED DESCRIPTION

The technology discussed herein comprises a system and methods for analyzing narratives provided in electronic narrative data form utilizing a processing system. The technology uses patterns in the electronic narrative data and data structures incorporating data defined using semiotic squares to analyze the narrative data to analyze stories and elements of textual content, find similarities amongst various stories, predict events which may occur in the stories, and provide various types of analysis on the narrative data in a programmatic manner.

The technology herein decomposes each set of narrative data into a series of discrete events, each event having a specific data structure and elements, and maps the events onto stories. Events are created based on a semiotic ontology, which defines verbs in sentences as of a number of different functional types. Based on the defined functional ontology, sentences are broken down into cases and events. Events can then be utilized to provide the different types of analyses, including creating a timeline, making a prediction about the next event in the story, and finding similarities between in individual story and other stories based on their semiotic structures.

The technology herein is based on semiotic squares at multiple different levels. At a first level, the squares are used to analyze the ontology of transaction-based functional verbs. A data structure comprising a plurality of verbs utilized in a particular language includes the root form for the semiotic square, and any number of verbs which complete one or more semiotic squares for that particular form. This semiotic data structure can be utilized at various levels in the analysis. At another level, the system looks for patterns which can be used to analyze stories. At yet another level, substitutions from a semiotic square into various events are utilized to detect similarities and semiotic structures across various stories.

Figure 1A:
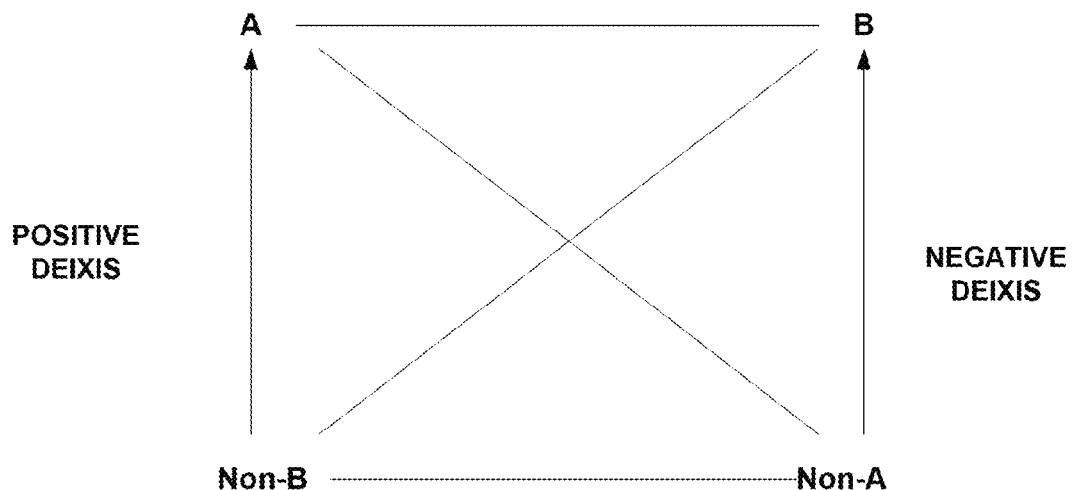
FIG. 1A depicts a generic semiotic square structure utilized in accordance with the present technology.

FIG. 1A illustrates a semiotic square, a tool used in structural analysis of the relationships between semiotic signs through the opposition of concepts. A semiotic square model can be used by the present technology to provide a narrative analysis in accordance with the discussion herein. The semiotic square model illustrates a number of relationships between functions in a narrative. A first relationship is based on a diagonal contradiction which is the presence/absence of a particular property such as Intelligence, Wealth, Appetite, Power, Beauty, Honesty, etc. As shown in FIG. 1A, 2 pairs of diagonal contradictions are obtained: A/Non-A, and B/Non-B. The second relationship is an opposition or antagonism of aims. For example, if appetite is aimed at eating, then anorexia is aimed at fasting. This is not a privative relationship, as anorexia is not defined by an absence of appetite, but instead by a willingness to not eat. In FIG. 1A, the relationship A/Non-A is the contradiction between do and don't do and A/B is the opposition between do and do not. Far from being privative, the will is equipollent, but the outcome is oriented in an opposite direction. In the semiotic square model of FIG. 1A, "A" is the A-ness which is the full realization of the property, the no nonsense summit, the factual one and "Non-A" is the failure, the absence, the un-A. "B" is the de-A, where A is deconstructed; this is a darker summit, where renouncement goes with deceit (renouncement to trust) or denial (renouncement to assertion). Finally, "Non-B" is the privation of this negative orientation, turning the same energy into an additive relationship.

SPA represents nominal, positive action. A subject's energy is oriented towards the achievement of a goal. SPNA is the nominal, failure to achieve the action which is supposed to be initiated by its subject. The failure is realized in absentia and may be reflected as a lack or loss of resources, skills, or energy. SPB represents energetic, emotional, negative counter action (antagonism) relative to SPA, oriented against the action which is supposed to be initiated by its subject, or towards the achievement of the failure thereof. The counteraction is realized in praesentia: sabotage, boycott. SPNB represents an energetic, emotional, or positive action. The subject's energy is oriented towards an unrestricted, self-indulging achievement of the goal.

Note that SPA or "positive" action refers to the expected result, and might have a negative or regressive formulation. Likewise, the SPB or antagonism can have a positive flavor. For example, one semiotic square may be reflected as: SPA—damage control; SPNA—out of control; SPB—proliferation; and SPNB—elimination.

Deixis are fundamental dimensions of the semiotic square. There is one "positive" deixis, and one "negative" deixis. The deixis is a posture "for" and "against" to emphasize that the two "sides" of the basic semiotic square are exclusive and potentially argumentative. The deixis is not only a certain value and a certain orientation, it is also a statement which may be supportive or adverse. The deixis height is described by its orientation, and is modulated by its intensity.

Figure 1B:
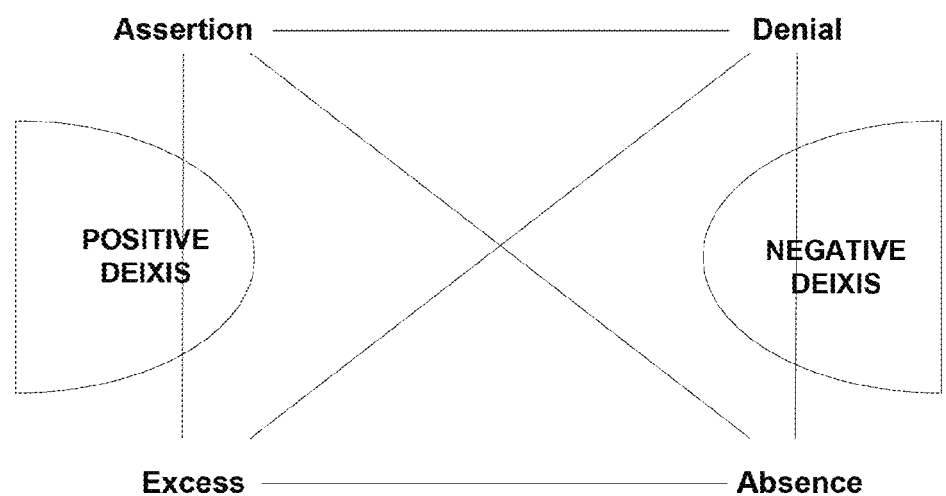
FIG. 1B depicts an exemplary semiotic square utilized in the technology discussed herein.

FIG. 1B represents a specific example of a semiotic square used in the present technology. In the present technology, the heuristic value of the square may be applied to elements of stories and story rules utilized by the technology to output various analyses of input narrative data describing a story.

The technology utilizes an application of the semiotic square to various narratives. The technology herein is based on the premise that communication is consubstantial to narratives, and using the core lexical semantics of a semiotic square results in a micro narrative for each term defined as the root of the semiotic square (SPA).

The semiotic square model allows core lexical semantics to be applied consistently the full vocabulary of the English language (or any other language). In FIG. 1B, the first relationship in a semiotic square is based on the opposition between assertion and absence, which is asymmetrical. If "eat" is asserted, then "fast" is to abstain from food (absence of appetite or absence of the right to eat). The second relationship is based on the adversity to what was asserted. If "eat" is asserted, denial of hunger is the adverse energy behind anorexia. The third relationship is based on the refusal of adversity, which ends up as a zealous support of assertion i.e. refraining from eating. The fourth relationship explains absence, as a repulsion of excess. These relationships provide the pervasive values behind the semiotic square model: starting from the matter of fact, and rotating clockwise, one has cynicism (adverse), asceticism (privative), and enthusiasm (excessive). This core ontology stands throughout the entirety of the English lexicon.

The two deixis, positive and negative, are symmetrical. The left (positive) deixis is generally based on a presupposition of states and gradation of intensity: excess directly presupposes assertion, and is a more intense state of the same. The negative deixis reflects a denial, and presupposes absence, and anorexia diet. Both deixis though are first and foremost defined by their argumentative stake: anorexia is more exactly defined as an inverted gluttony than as an excessive diet, and the reverse is true for anorexia vs. gluttony.

A swap of these two positions is a staple of plot reversals. For example, some stories reflect that a most hardened criminal can be converted into a good person. The principles are used in analysis of narrative data relative to stories in the present technology.

FIG. 2 illustrates the functional components of a computing environment 200 suitable for use with the present technology. The environment 200 includes hardware (as illustrated in FIG. 37) which may include one or more processors, nonvolatile memory, and random access memory suitable for implementing the functional elements and storage elements. Computing environment 200 includes a parser 205, an event interpreter 212, and an analysis engine 250 which includes a story interpreter 214. Also shown in computing environment 200 are a parser dictionary data store 215, a sentence rule data store 220, event rule data store 230, story rule data store 240, semiotic square and function mapping data store 245 and a classified/mapped data store 280. Computing environment 200 takes as input electronic narrative data 218 in textual form for evaluation. Multiple items of narrative data 218 may be used as input for a single story or multiple stores. The parser 205 breaks down elements of the narrative data for use by other processing elements. The event interpreter takes parsed data from the parser and maps parsed data into events based on event rules 230 and semiotic square and function mapping values from the semiotic square and function mapping data store 245. Events can be store in the classified/mapped data store 280, and processed by the analysis engine 250. One component of the analysis engine 2250 is the story interpreter which may generate collated stories, timelines and other types of outputs which are provided to an output device 260. A classified/mapped data store 280 stores multiple levels of evaluated text from input narrative data 218, including parsed data identified as parts of speech, verbs classified by their functional mapping, mapped event data, mapped case data, and mapped story data. In FIG. 2, while the parser 205, event interpreter 212, story interpreter 214, an analysis engine 250 are depicted as separate functional elements, it will be recognized that these functional elements may be combined in any number of different combinations and need not comprise physically or programmatically separate elements. Furthermore while each of the respective data structures are illustrated as separate data structures, the organization illustrated in FIG. 2 is for convenience in understanding only. The specific data structures utilized can be combined and organized in other logical ways.

Narrative data 218 may comprise data input from various sources such as commercial new sources, user data, social networks, or any third party narrative textual data source. Multiple sets of data may be provided as a set of data. Narrative data may comprise a story drafted on a given date at a given time.

Each story comprises a narrative and cast, where each narrative is a pattern of events. Multiple stories based on multiple items of narrative data 218 may be analyzed, each story analysis building on any previous story analysis performed by computing environment 200. Various versions of a single story theme or subject may be provided.

Analyses performed by the computer environment 200 are provided to an output 260. The output 260 may comprise, in various environments, any form of user perceptible device including, but not limited to, a display device, another computing environment, a processing device, or a processing service, such as a story-based social network as described herein.

Parser 205 is configured to accept each of any number of sets of narrative data 218, reduce each of the words therein into individual tokens and parts of speech, and present the tokens parts of speech (POS) to the interpreter 212. Parser 205 is configured to evaluate English grammar patterns for phrases, clauses, and sentences, data for which his stored in a parser dictionary 215. A sentence pattern is a sequence combining clause patterns, phrase patterns, and parts of speech. The parser 205 breaks down sentence patterns to extract and classify parts of speech in incoming text in the narrative data 218.

Sentence rules 220 provide grammar patterns for phrases, clauses, and sentences, and are utilized by the parser 205 to break down the text narrative data 218 into usable data structures allowing computation and analysis as discussed herein.

The event interpreter 212 utilizes event rules 230, and semiotic square values and function maps data store 245 to classify functions and parts of speech into case structures (or frames), and later into event structures, which can then be mapped to story patterns.

The functions performed by the parser 205, event interpreter 212 and story interpreter 214 may be integrated into one or more software components run on a processing device similar to that illustrated in FIG. 37, provided as separate components, separated into different processing environments and different processing devices, and run in serial or in parallel processing environments.

The analysis engine 250 may perform various types of analyses on the data classified as events by the event interpreter. In one example, the story interpreter 214 orders a textual sequence from the narrative data 218 into a set of threads inside a story, sometimes referred to herein as a timeline.

Once one or more sets of narrative data 218 have been broken into discrete events by the event interpreter 212, each event may be stored as event data in the classified and mapped data store 280. The story interpreter 214 reads the classified and mapped data store 280 for event data to be mapped to stories. Events can be further processed by the analysis engine 250. Once the narrative data is broken into events, one can perform any number of different manipulations of the events, including but not limited to the creation of timelines, creating dynamically updating timelines (as new events occur), and predicting future events in timelines or stories.

Different types of analyses are provided by the analysis engine 250. In one type of analysis, analysis engine 250 can provide a timeline of discrete events, defined in terms of a number of events and the importance of the events. Still further, the analysis engine 250 can generate predictions using a prediction engine. A prediction of a next possible event in a story can be created using the techniques discussed herein. In addition, a similarity determination can be made between stories. For example, a current news story regarding the potential cheating of a sports organization's marquee quarterback can be compared and found similar to cheating scandals involving marquee players in other sports, or cheating scandals involving the same organization but involving different personnel.

Figure 3:
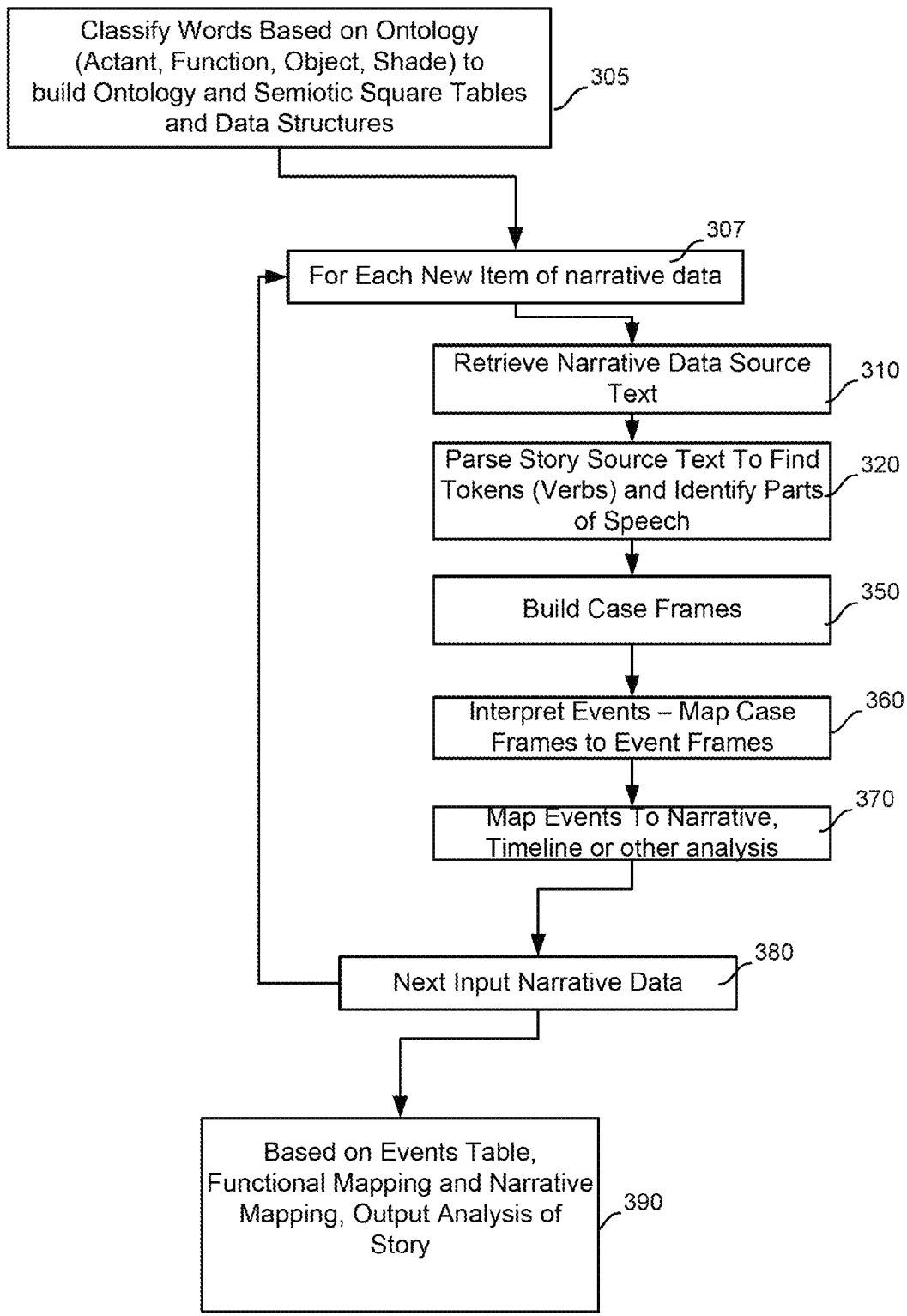
FIG. 3 is a flowchart illustrating a general computer implemented method for analyzing a narrative in accordance with the technology discussed herein.

FIG. 3 illustrates a method performed in accordance with the present technology to provide machine implemented story analysis. At 305, at any time prior to receipt of narrative data for story analysis, an analysis functional ontology is created. The ontology is utilized as a foundation for the analysis provided herein to both extract and characterize events in input narrative data and to map those events to a story. The examples of such characterization will be presented herein as example in English, but it should be understood that the underlying principles herein will apply to any language. In the present technology, verbs are classified into an ontology based on their functions. In alternative embodiments, the ontology may be continuously updated at 305 as processing of new sets of narrative data continues.

Figure 26:
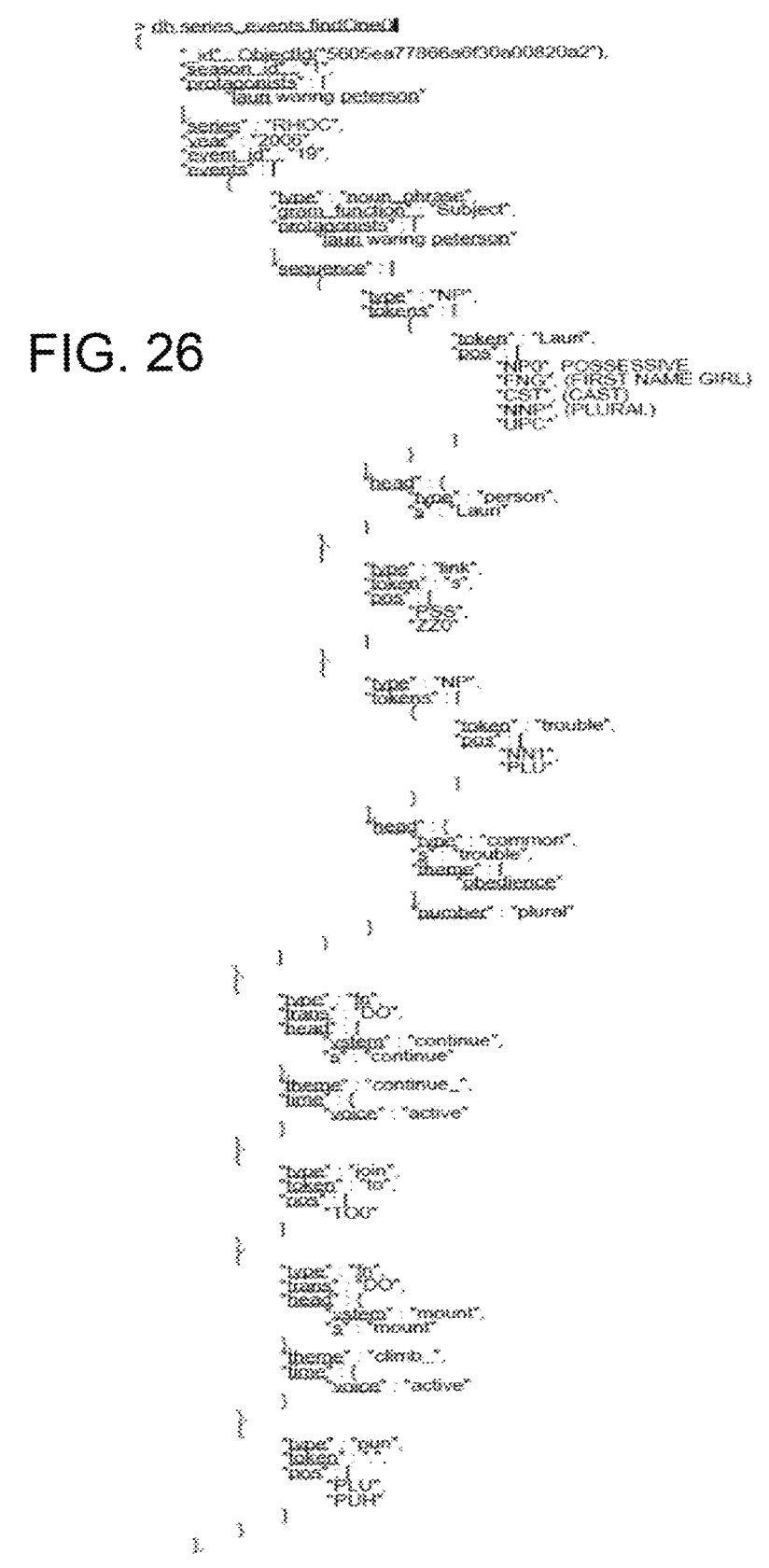
Figure 27:
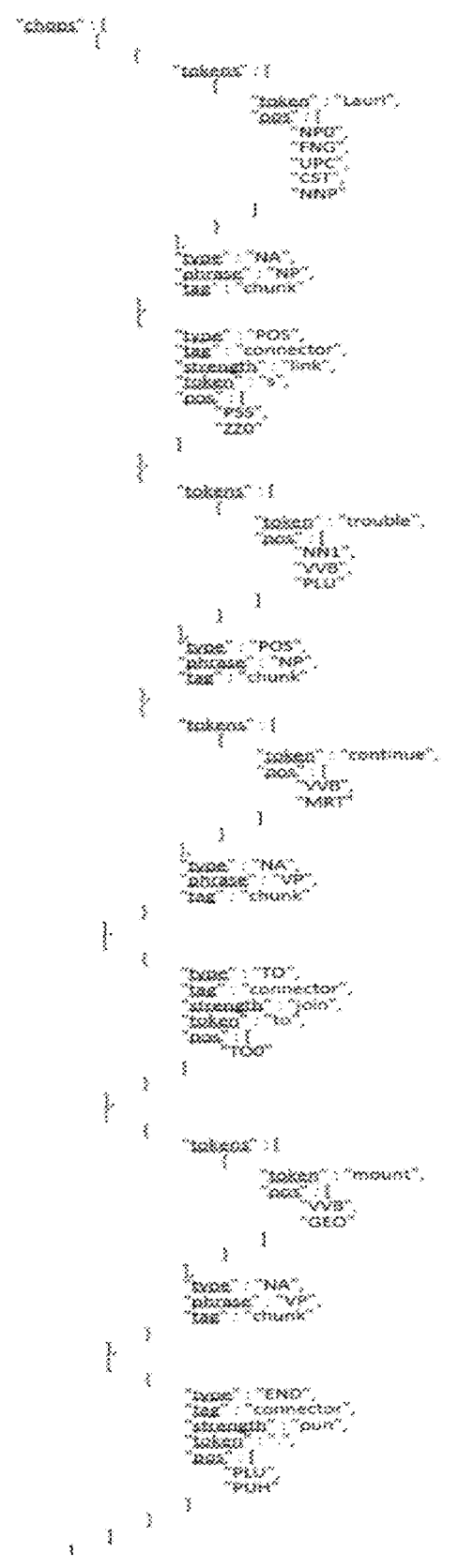

Once the ontology is created at 305, at 307 for each set of narrative data 218, narrative data source text is retrieved at 310, and parsed at 320 to find tokens (verbs) and identify parts of speech. The tokens and parts of speech are utilized to build case frames at 350 which are stored as element records (FIG. 26-27). These case frames are then mapped to event frames at 360. Both case frames and events are stores as data structures, mapping the text from the narrative data source to data structures which can be utilized programmatically to produce an output of the analysis engine. Examples of such data structures are shown in FIGS. 26-30. Once events are mapped and stored in event frames, the result of step 360 is a plurality of event records for each item or set of narrative data. The event records may be manipulated in a variety of ways. In one embodiment, events are mapped to a narrative context by the story interpreter, and can be manipulated to produce one of several types of story analyses as indicated at 370 in FIG. 3. Events are then mapped to timelines or other analyses for output at 370

The method moves on to the next input data source 380. At 390, based on the events table, functional mapping and narrative mapping, an analysis of the story can be prepared. Various examples of story analysis are described herein. Each of these various steps as described further below.

With reference to step 305, in one embodiment, the method classifies words into an ontology including functions (verbs), actors (nouns) and shades (adjectives/adverbs). Each classification in this ontology describes an importance to various types of functions, actors, and shades. In accordance with the technology, a unique structure of property isotopies (physical, cognitive, and the like) is used to organize both entities and transformations, based on a functional mapping between transformations and properties.

For each classified word in the ontology, semiotic squares may be built. As used herein, a semiotic square for a word is provided in a data structure identifying for each root word those words related in a semiotic square. Some squares include all four terms of the square (SPA, SPB, SPNA, SPNB) while others may have only partial terms. Building a semiotic square for each word comprises creating a data structure including, for each word, between one and three additional terms completing the square. While conventional formalisms have language formalized as a first-order predicate logic in terms of dyadic antonyms, the semiotic square model adds two values to the dyadic antonyms and it adds a deictic perspective to the self-stated and context-free value of the initial pair.

Choices as to elements for each of the values of any square are defined in the semiotic square data store 245. In one example, data structures such as those illustrated in FIGS. 11-18 (showing representative portions of data structures for various functional classifications) are used. Definition of each square is created in the data structure prior to use of the data structure in analysis. In one embodiment, such data structures are stored in the data store 245 of FIG. 1. As a result, data store 245 may include thousands of defined semiotic squares.

In further consideration of step 305, ones of the squares defining verbs into various functional classifications are used interpretively. In accordance with the semiotic ontology, each verb in the language is classified into one of a number of functional types. Such functional types are classified as DO, and MAKE or TRANS. TRANS functions comprise three different types: TRANS-formation, TRANS-action, and TRANS-fer functions.

DO functions comprise all verbs that do not alter the state of a recipient (or actor), or do not involve an agent when they have a recipient (or actor).

A first type of DO verbs are the "state" and "activity", "atelic", verbs as defined in Vendler, Zeno (1957). "*Verbs and times*". The Philosophical Review 66 (2): 143-160. Under Vendler's model, events may be classified into one of four aspectual classes: states, which are static and do not have an endpoint ("know," "love"); activities, which are dynamic and do not have an endpoint ("run," "drive"); accomplishments, which have an endpoint and are incremental or gradual ("paint a picture," "build a house"); and achievements, which have an endpoint and occur instantaneously.

A second type DO verbs describe natural or physical changes: erupt, blossom, effervesce, etc. Although this second group of verbs generally do not have actors or agents, it is possible to consider semiotic square patterns for each of these type of verbs. For example, "flow" is a state of a liquid. A semiotic square for "flow" may be SPA: "Flow," SPB: "Obstruct," SPNA: "Trickle," SPNB: "Pour." Note that DO verbs can have an instrument or object, for example "Walk with a stick."

All other verbs fall into the TRANS category comprising: TRANS-formation, TRANS-fer and TRANS-action. Each such verb has an actor (person) who is an agent. TRANS-FERS and TRANSACTION have an animated recipient actor, and are typically ditransitive. Examples include: accord, afford, allocate, allow, and appoint. Each of these examples is a verb which takes a subject and two objects which refer to a theme and a recipient. These objects may be called direct and indirect, or primary and secondary.

Each type of function in the ontology allows for basic assumptions about the use of the verb to be utilized in computational narrative analysis.

TRANSFORMATIONS generally refer to a function of "to MAKE" and are therefore classified by the system as "MAKE" functions in a data structure mapping the terms to parts of speech. TRANSFORMATIONS are verbs of the form taken by objects, including their properties, and their formation (or changes to their state). A TRANSFORMATION is a function applied to a recipient to change its property from one state of property or intensity to another. The resulting state entails the pre-supposed pre-existing state, since MAKE changes the direction of a property to its opposite value.

A TRANSFORMATION function verb does not have both a donor and recipient which are animated. As such, either a sentence subject or a sentence object may be animated, but not both.

In a TRANSFORMATION clause, if the object O is animated, the subject S is not. For example, the statement "Cancer killed him" maps subject, verb and object as follows: S='cancer', V='killed', O='him'. Since 'cancer' is inanimate, it becomes an instrument of the transformation verb "killed" such that a mapping of the sentence by the parser (discussed below) may be {MAKE, object O='him', 'PHYSICAL_STATE', 'dead' is the SPNA, the instrument INST='cancer'}.

Conversely, if the subject S is animated, the object O is not, this reflects a passive object and the subject becomes the instrument. Consider the exemplary sentence: "He died from cancer." If there is an instrument ('from cancer'), then there is a change of state. Since 'he' doesn't control the action, the object slot shifts such that a mapping of the sentence by the parser may be object O='he', 'PHYSICAL_STATE', 'dead' is the SPNA, and the instrument INST='cancer.' This mapping may take the form {MAKE, O='he', ('PHYSICAL_STATE', 'dead', SPNA), INST='cancer'}.

This is in contrast to a sentence such as "Somebody killed him." As discussed below, where S and O are animated entities, this is a contract and the function is a TRANSFER function. A mapping of a transfer function may take the form {XTRANSFER, S='somebody', O='him', ('ATTACK', SPNA)}. (An XTRANSFER function is a type of TRANSFER function, discussed below.)

Another type of TRANS verb is a TRANS-fer which deals with verbs that transfer an object without direct reciprocity between actors, as in "send" or "receive." In a TRANSFER function, a contract between two actors is implicit (and required), and breaking the contract is a transgression.

TRANSFER verbs can be separated into abstract transfer (ATRANS), mental transfer (MTRANS), emotional transfer (ETRANS), physical transfer (PTRANS) and conflict transfer (XTRANSFER).

Abstract transfer functions comprise verbs denoting transfer of possession. Example verbs of this type include "get," "give," and "donate." An exemplary semiotic square for "give" would be: SPA—"give/receive," SPNA—"not give or not receive," SPB—"deprive," and SPNB—"spoil."

Figure 11:
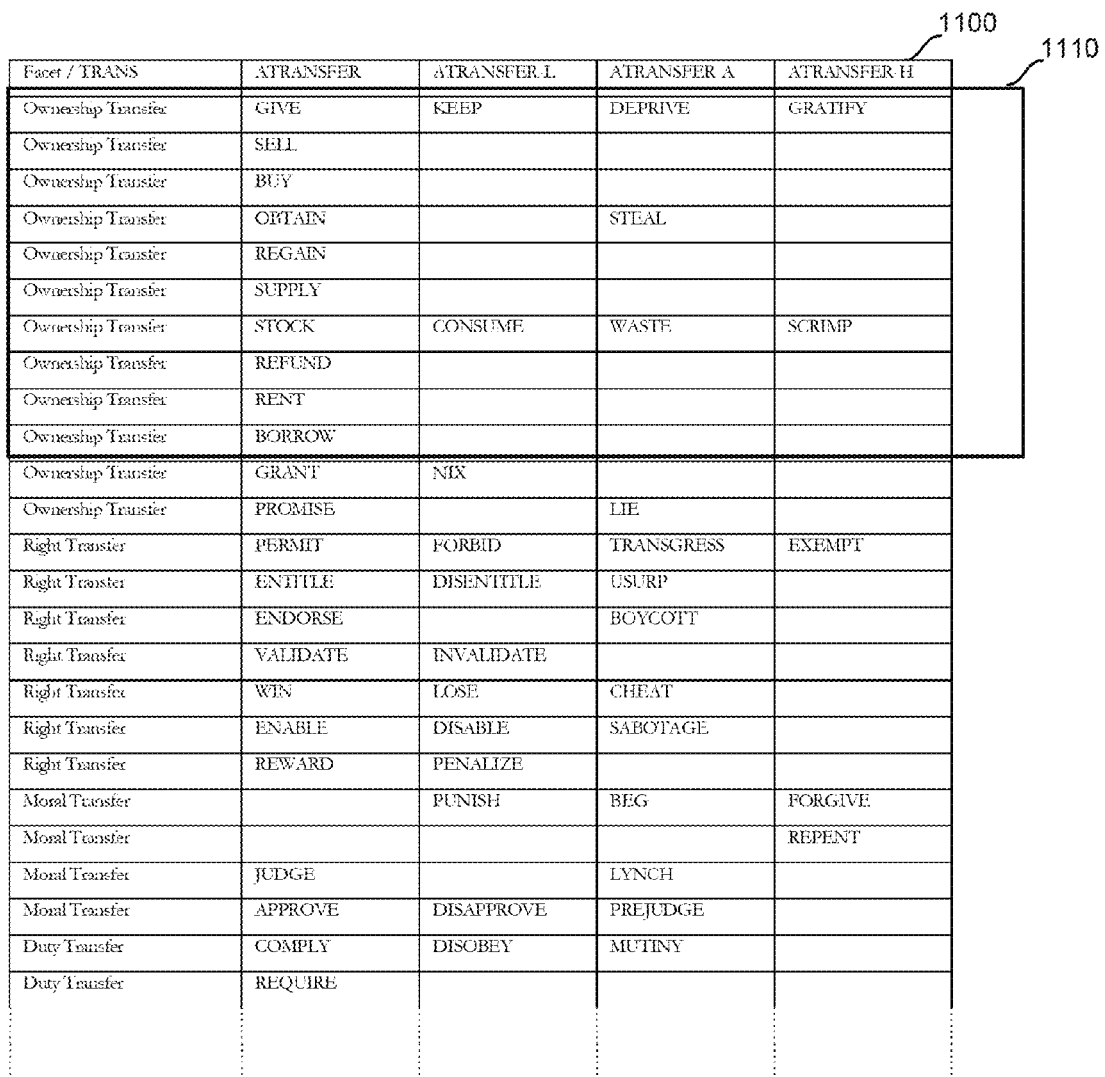
FIG. 11 is a table illustrating a semiotic square reflected in data structure for a series of abstract transfer functions.

FIG. 11 illustrates a semiotic square data table for a series of abstract transfer (ATRANS) functions. The table may be stored in a data structure such as data store 245 of FIG. 1. The table 1100 in FIG. 11 is merely representative of a small portion of the data which structure 1100 may be included in the computing environment 200. It will be understood that there are thousands of more rows than those illustrated in FIG. 11, but for simplicity only a subset of the rows in the data structure are shown.

For a given term "give" in FIG. 11, each row illustrates a square 1110 of the term, with subsequent rows in any same column comprising synonyms at their relative place in the data structure. For the term "give" in the ATRANSFER (SPA) column, SPB is "keep", SPNA is "deprive", and SPNB is "gratify". The terms "sell", "buy", and "obtain" are all synonyms of "give," with "steal" being the opposite of "obtain."

Mental transfer functions (MTRANS) comprise those functions denoting communication, or a mental or spiritual transaction. Examples of mental transfer functions include transfers of knowledge: "educate", "convince", "influence". Examples further semiotic squares for "advise" or "listen" (as SPA) would include "not suggest" or "not listen", "free mind", and "exhortation." FIG. 12 is a table illustrating a semiotic square data table for a series of mental transfer functions. Again, FIG. 12 represents only a small portion of the data store 245 of computing environment 200.

Physical transfer functions (PTRANS) are verbs denoting a travel or physical movement. FIG. 14 is a table illustrating a semiotic square data table for a series of physical transfer functions.

Emotional transfer functions (ETRANS) are verbs denoting a transfer of an emotional state. Examples include "like" and "love". FIG. 13 is a table illustrating a semiotic square data table for a series of emotional transfer functions.

The conflict group of transfer verbs (XTRANSFER) is often found in narratives, associated with typical actors: villain, victim, nemesis, ally, traitor, under cover, mediator, and witness. These functions also have typical and predictable prequels and sequels: transgress, attack, ask for/get help, retaliate, pursuit, retribution; and predictable sequences of events: attack, mediate, witness, retaliate, pursuit, retribution. Conflict transactions can include a twist: witness becomes victim, or a party is betrayed. FIG. 15 is a table illustrating a semiotic square data table for a series of conflict transfer functions.

Another functional type are TRANS-actions. TRANSACTION functions have donor, recipient, and object. The actors or parties involved are generally more important than the object involved, and the object of the transaction is likely to stay unchanged other than the change in the ownership.

Most transactions are expressed by entailment: something that follows logically from or is implied by something else. For example: "If you take a drug, this drug has been administered to you."

TRANSACTION functions can likewise be broken down into abstract (ATRANSACT) transaction functions, mental (MTRANSACT) transaction functions and conflict (XTRANSACT) transaction functions. FIG. 16 is a table illustrating a semiotic square data table for a series of abstract transactions. FIG. 17 is a table illustrating semiotic square data table for a series of mental transactions. FIG. 18 is a table illustrating a semiotic square data table for a series of conflict transactions. Again, each of FIGS. 16, 17 and 18 are only partial representations of data tables utilized to store classifications of the functional ontology described herein.

Figure 19:
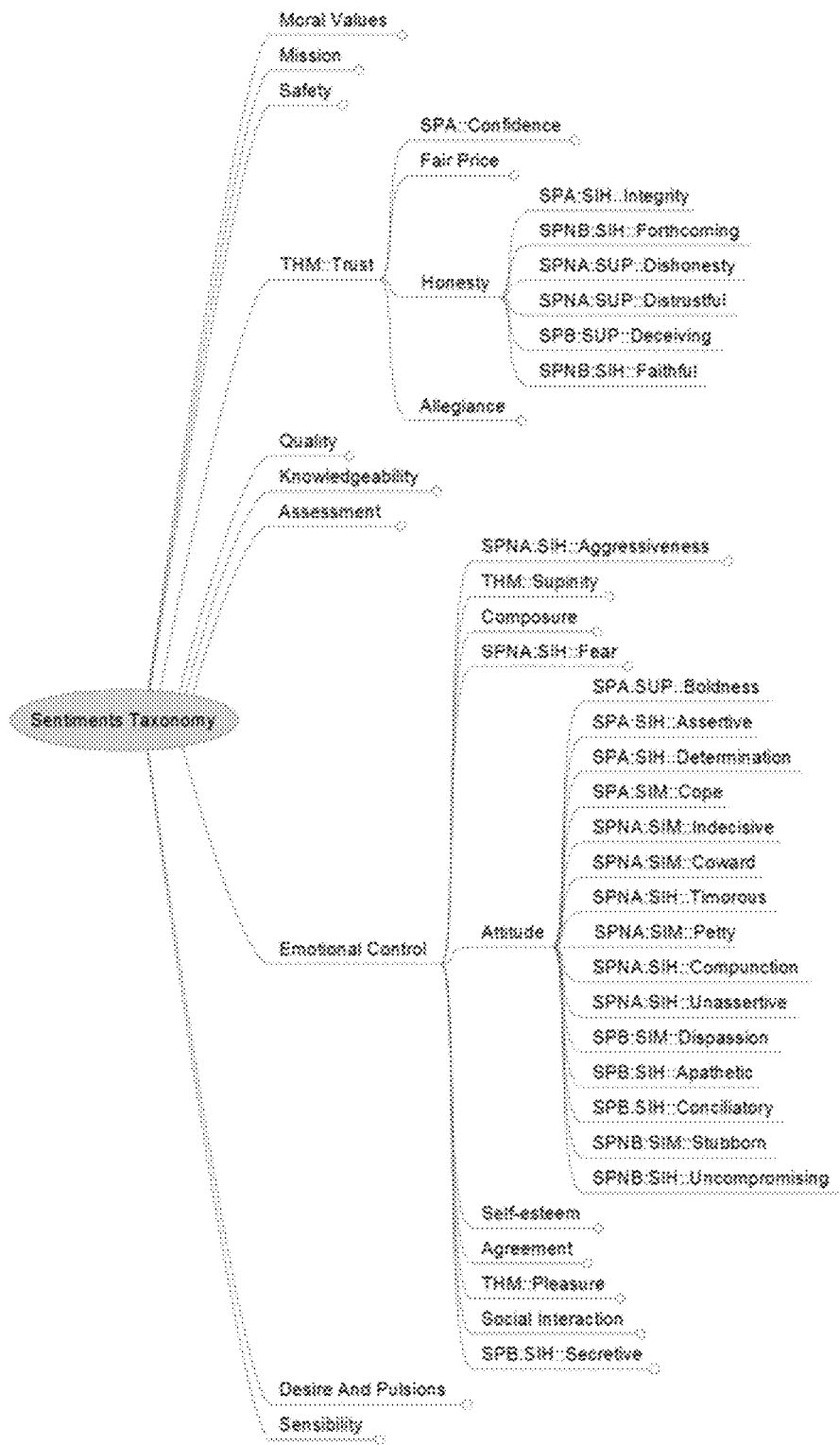
FIG. 19 is an illustration of a sentiment taxonomy.

Included in the ontology are sentiments, emotions and sensations, collectively referred to herein as "shades." Shades are generally introduced by adjectives and adverbs. FIG. 19 is an illustration of a sentiment or shade taxonomy.

Adjectives used to express properties, and verbs used to express changes occurring to these properties, are generally equivalent. In transformation verb uses, the nuances of time or accomplishment in the different ways of expressing the change of state are generally irrelevant. The differences between these phrases "I'm angry" relative to the phrase "This angers me" are insubstantial from a story analysis perspective.

The ontology used in the present technology defines what can be considered to be a set of micro-narratives. As opposed to pairs of opposing words, the semiotic square lexicon includes, the basis of a micro-narrative based on a presumption of narrative balance. The narrative balance foundation states that, for almost any story, a "balance" exists between positive and negative elements or actions in the story. Consider for example a simple story where a villain starts out with a good degree of power and ultimately ends up being the subject of justice. Actions of the villain at the beginning of the story lead to repercussions for such actions at the end of the story.

The functional ontology—the classification of the verbs into functions—carries through the programmatic analysis of narrative data by allowing programmatic coupling of relationships in events to expand analysis of narrative data into various different types of outputs.

Each semiotic square may have a similar built in balance. Consider the square of "Flow," "Obstruct," "Trickle," "Pour." Where there is an obstruction, "flow" is prevented, but one may consider that at some point the obstruction will be removed and the flow restarted. The inherent balance in each semiotic square may be utilized in conjunction with the ontology as the basis for elements of the predictive analysis system herein.

This narrative balance is built into the constructs, described herein, which are utilized in the computations of story analysis.

Returning to FIG. 3, as a set of narrative data text is received at 310, the set of data is parsed at 320 to find tokens and parts of speech.

Finding inputs for event analysis is performed by the parser 205. The parser may comprise code adapted to evaluate English grammar patterns for phrases, clauses, and sentences. A sentence pattern is a sequence combining clause patterns, phrase patterns, and parts of speech. The interpreter breaks down sentence patterns to extract and classify parts of speech in incoming narrative data.

An exemplary sentence pattern is "c contrast_connective c" where "c" is a clause and "contrast_connective" is a connector between the clauses. Taking as an example the sentence "This hurts but I don't mind", the sentence maps to: c: "this hurts", contrast_connective: "but", c: "I don't mind". Note that sentence patterns are discourse patterns using concession, contrast, and the like. These connective patterns are carried along to other portions of the text evaluation to help the parser 205 to articulate the thread in a sentence of data.

A clause pattern breaks down into a noun part (np) and a verb part (vp) (clause pattern=np vp). For example "This sucks" maps to {np: "this", vp: "sucks"} and "I don't mind" maps to {np: "I", vp: "don't mind"}. This mapping may be stored in the mapped and classified data store 280.

The clause pattern may be further broken down into a phrase pattern of a proper noun (pn). The phrase pattern may simple be the nouns, where, for example, "this" maps to {pn: "this"} and "I" maps to {pn: "I"}.

Each level of pattern (sentence, clause, phrase) is evaluated using a set of rules describing each possible pattern at that level Exemplary sentence rules may take the form:
  (s, [c]),
  (s, [c, break?, contrast_connective, c]),
  (s, [contrast_connective, c, break?, c])
  . . . .
The above sentence rules show three examples of a set of sentence rules which may run into the thousands. Clause rules take the form:
  (c, [vp, pp?]), (c, [aux, np])
  . . . .
Similarly, while only one clause rule is illustrated above, clause rules can run into the thousands for various presentations of clauses available in the English language. In the above clause rule example, the question mark allows the parser to skip optional items. "Soft" breaks may close a clause, although they can be explicitly stated as mandatory or optional.

An exemplary phrase rule takes the form:
  (np, [det, adj, n]), (np, [pn])
  . . . .
Again, there may be hundreds or thousands of phrase rules defined for each computing environment 200. Sentence rules are stored in a sentence rules data store 220, while clause and phrase rules may be stored in the parser dictionary data store 215. It should be recognized that these databases can be combined.

The parser 205 will match the word values to a parser dictionary data store 215 which includes a definition for each word, the definition classifying the word as its potential usage form in sentences. Such lists can be updated dynamically as needed as meanings of words change over time.

The result of the parsing performed at 320 is a set of tokens and parts of speech which are used by interpreter 212 to classify the mapped data in data store 280.

Returning to FIG. 3, at 350, events analysis occurs by mapping the phrases and clauses to a case frame, with each case frame based on the functional classification. The events are stored by EVENTID in the classified/mapped data store 280 at 360. A method for mapping verbs and parts of speech to a case frame which is later used for event analysis is discussed below with respect to FIG. 4.

Figure 4:
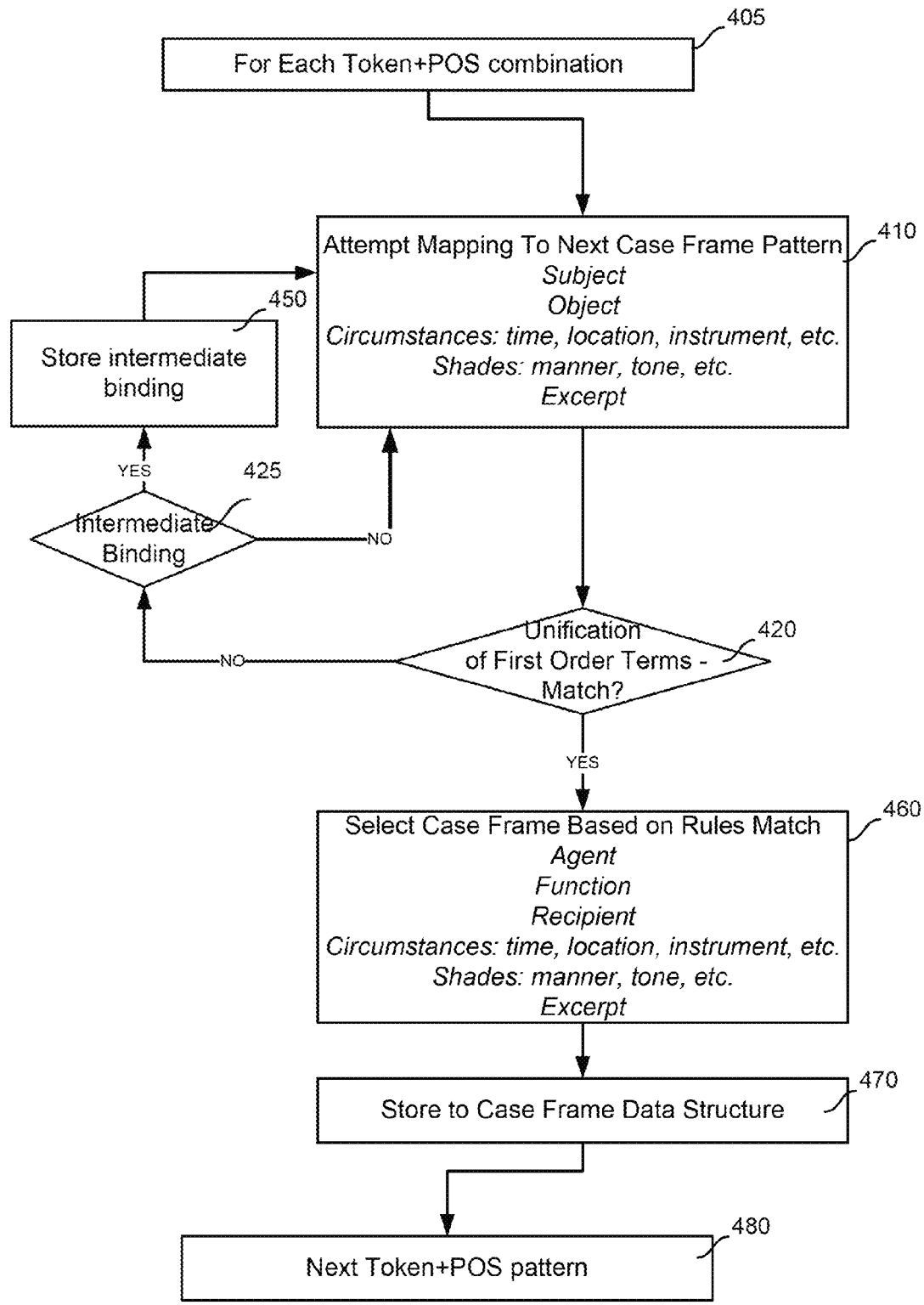
FIG. 4 is a flowchart illustrating a step of building an events table in the method of FIG. 3.

FIG. 4 illustrates one method for performing step 350 in FIG. 2. At 405, for each token and part of speech combination, then at 410, method will attempt to map the token and part of speech combination to a particular case frame. A token comprises a functional verb defined in accordance with the foregoing description.

A case frame is a mapping of the token and part of speech into one or more context maps. Each case frame is a map of the sentence data to a subject, an object, circumstances (i.e. time, location, instrument), shades (manner and tone), and an excerpt. Each mapped case frame may comprise a case frame record identifying the respective words in a sentence to their constituent portion of the case frame.

The event interpreter loops though steps 410, 420, 425 and 450 to attempt matching of tokens and parts of speech combinations to case frame patterns. At 410, pattern items are demonstrated from left to right in a sentence of text data, following case frame rules and using a syntactic unification of first-order terms. The unified terms of the first successful solution are returned as the dictionary of binding results (unifiers in solution) at 420 and the case frame is selected at 460 and stored at 470.

Additional rules map the interpreter bindings to the case frame at 460, where each case frame may include: SUBJECT (agent), FUNCTION, OBJECT, and RECIPIENT at 460. Additional rules include, for a subject:
  If the voice is active, and there is no inversion, then the
    lead noun in the lead np is the subject;
    else the lead noun is the last noun found in np;
    else the lead np is the first np found in clause.
  For an Object, the object is the direct object of the verb.
  For a recipient, the recipient is the indirect object of the
    verb
Specific rules may be provided to handle multiple clauses, interpreted according to their connective pattern: sequential clauses, prepositional clauses, relative clauses, introducing complementary events into the timeline, and subordinate clauses, flattened when introduced by verbs of "thinking" or "saying".

At 460, the case frame is selected based on the first order matching performed at 420, the data stored in the case frame at 470 (in, for example, data store 280). If no good match exists at 420, the case rules are sorted, and if an intermediate binding exists at 425, the intermediate bindings are stored at 450 in a data structure stack to allow backtracking and optimization of the event interpreter 212. Any remaining list of input tokens is carried across sequential terms as the method loops back to 410, where mapping continues looping from 480 to 410 for all tokens and POS until all tokens and POS patterns are completed Again returning to FIG. 3, at 360, event mappings are built from case frame mappings. Mapped event data is stored in an event record (having a format similar to that of FIGS. 11-18) for later use interpreting the narrative data in the context of a story in accordance with the description below. A stored event frame including data elements from narrative data created in accordance with the foregoing comprises an event record.

Figure 5:
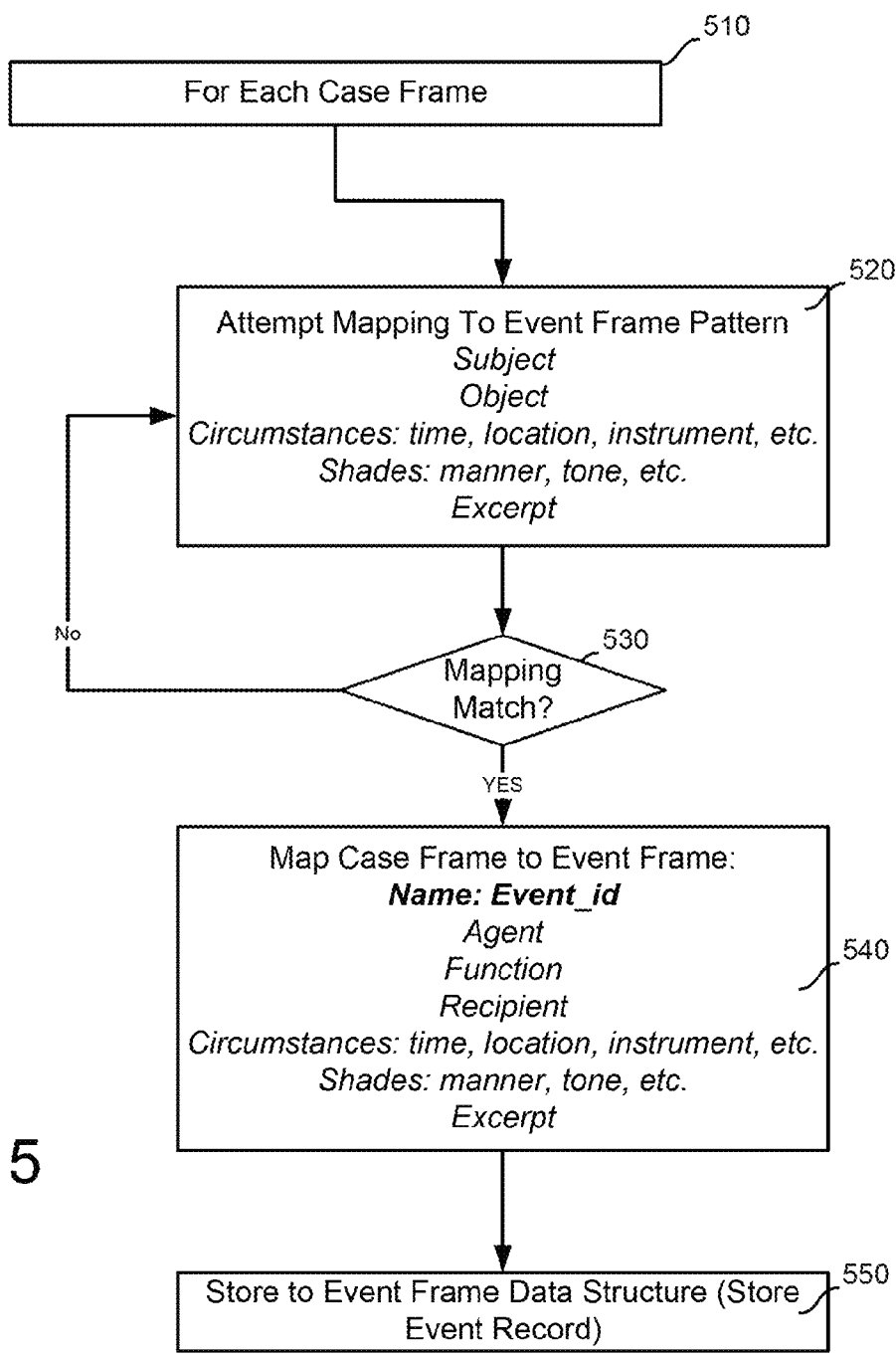
FIG. 5 is a flowchart illustrating a step of interpreting events in the event table.

A method for mapping case frames to events is discussed below with respect to FIG. 5. FIG. 5 illustrates one method for performing step 360 in FIG. 3. At 510, for each mapped case frame, at 520 an attempt is made to map the case frame (with some potential modifications) into an event frame. There are five event frames for the five core semiotic function models: PRP (Property attribution by copula), DO, TRANSFORM, TRANSFER, and TRANSACT. Each event model defines the mapping between case and event. The elements of the event model include: agent; function; recipient; circumstances (such as time, location, instrument, and the like); shades (such as manner and tone); and excerpt. For example, an event frame may take the form:

---
Event_id
Cast
    Actor
        Agent
    Actor
        Agent
Narrative
    Function
Circumstances: time, location, instrument, etc.
Shades: manner, tone, etc.
Excerpt

---

If a match between a case frame and an event frame occurs at 530, then a mapping occurs at 540 and an event record is stored at 550. If no match occurs at 530, then the method continues until a mapping between a case frame and event frame occurs.

Property (PRP) attribution by copula applies to clauses (or case frames) which have a subject, verb, and complement, and where, in general, a complement comprises a property relative to the subject. Hence, the attribution is the description provided by the adjective of the subject. A PRP mapping defines properties acquired by the target through PRP attribution, beneficial or detrimental.

In one embodiment, DO and TRANSFORM functions (i.e. MAKE functions) may be skipped at succeeding levels of interpretation. In other words, detection of a DO or TRANSFORM verb is stored, but not used in analysis in a story mapping analysis. Most MAKE functions are descriptive of occurrences in sentence data. However, some MAKE functions may be important to a realization of a TRANSACTION or a TRANSFER. When a MAKE function is unrelated to any TRANSACTION or TRANSFER event, it may also discarded. However, the technology categorizes and stores DO and TRANSFORM functions as they may be utilized in other analysis embodiments of the technology.

TRANSFER functions are most frequently found in a story narrative and imply asymmetrical transfer, such as abuse, mischief, and deceit. For TRANSFER functions, the cast of actors involved is mapped to fit the semiotic square value of the TRANSFER function. For example, the agent of a detrimental transfer like "abuse" is one of a "villain" or "trickster". The recipient of a detrimental transfer like "abuse" is the "victim."

TRANSACTION functions define a symmetrical event, typically found in the climax event. Examples of a symmetrical event denote symmetry between the actors, such as a conspiracy or alliance. The cast of actors involved is adjusted to fit the semiotic square value of the function. In addition, co-agents of a symmetrical transaction like "conspiracy" may be included.

Once events are mapped and stored in event frames, the result of step 360 is a plurality of event records for each item or set of narrative data. The event records may be manipulated in a variety of ways. In one embodiment, events are mapped to a narrative context by the story interpreter, and can be manipulated to produce one of several types of story analyses as indicated at 370 in FIG. 3.

FIG. 25A illustrates a summary of a television program with emphasis on a sentence whose structure is exemplified in the data structures shown herein. The summary illustrated in FIG. 25A may be a computer generated summary or a human created, narrative data input. Presently, a popular television program is the reality television program "Real Housewives of Orange County." The show has a number of characters and FIG. 25A represents a summary of a portion of one episode. Emphasis is placed on the sentence "Lauri's troubles continue to mount" which will be used as an illustration in the following figures as to how a sentence is incorporated into an even data structure and thereafter used by the present technology.

FIG. 25B illustrates a data structure encapsulating the summary of FIG. 25A. As shown therein, the summary of FIG. 25A is provided with a number of sentences reflecting different events which take place in the television narrative. For purposes of example, the succeeding figures show break-down and storage of the text "Lauri's troubles continue to mount." The data structure. FIG. 25B includes a document ID, unique to the particular document, and the specific text, in this case a sentence, which is analyzed in the data structures of FIGS. 26 and 27. FIGS. 25B, 26, and 27 can represent a single data structure utilized to store all the parts of speech and tokens for the sentence "Lauri's troubles continue to mount" within the context of the summary illustrated in FIG. 25A.

FIG. 26 illustrates a first portion of a data structure utilized in accordance with the teachings herein to store an event based on the sentence "Lauri's troubles continue to mount." As illustrated therein, each event has a specific unique identifier (OBJECTID) and may include data associating the event with a particular season (SEASONID) and protagonist (in this example, "Lauri Waring Peterson", a character on the show). Also included is data on the "series" and "year." The event is broken down into a "type: noun phrase" for "Lauri Waring Peterson" and further broken downs into specific identifiers for each word in the phrase. Functions are identified and stored. In this case, the terms "mount" and "continue" are identified as DO functions. Notably this sentence is descriptive in nature and does not include any TRANSACTION or TRANSFORM functions—no action happens in the sentence.

FIG. 26, the elements of the sentence are classified according to their usage and the functional ontology. For example, the token "Lauri" is a noun phrase classified as possessive (NP0), Lauri is the first name of a girl (FNG), is a member of the cast (CST), and is also a plural proper noun (NNP).

FIG. 27 illustrates a second portion of the data structure used to store the event a data highlighted in FIG. 25A. FIG. 27 illustrates a structure similar to FIG. 26, except that it in this structure, the individual tokens and identifying characteristics thereof are stored, whereas in FIG. 26, more contextual information is stored. Individual characteristics of each token is stored in this data structure which allows for additional types of manipulation of the data in the input narrative. It should be noted that the data structures of FIGS. 25B, 26 and 27 may all be linked as a single structure.

FIG. 28 illustrates the data structure of FIG. 25B used to store a different sentence and different summary. This summary is from a different episode of the same television show and states: "Jo gets dumped by her boyfriend Slade. Lauri gets a ring. Lauri's son Josh moves into the town house next season but "breaks house rules" and is kicked out and then moved into Lauri's new husband's ex-wife's house." Any different number of summaries may be stored in the data structure and combined together to create a season summary narrative of the show. In FIG. 28, the sentence "Lauri gets a ring" is emphasized. However, it should be noted that in the actual data structure, the sentence is plaintext.

Figure 29:
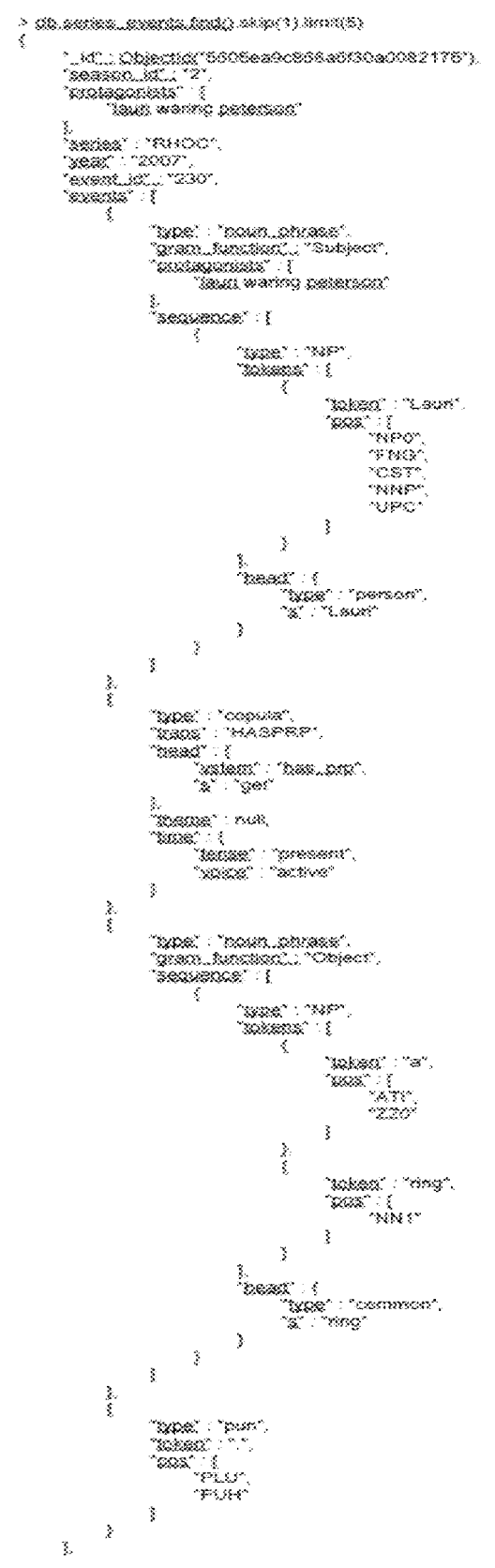

FIG. 29 illustrates a first portion of a data structure utilized in accordance with the teachings herein to store a characterization of the sentence of FIG. 28. FIG. 29 illustrates the data structure used to store the sentence "Lauri gets a ring" from the summary of FIG. 28. The data structure. FIG. 29 is similar to that of FIG. 26. It should be noted that in FIG. 29, a different, unique object ID, different season ID, different year, and a different event ID are all illustrated. The protagonist in this instance is the same—Lauri Waring Peterson—and the data structure thereafter identifies each of the particular tokens in the sentence and classifies them according to their functional nature in the functional ontology. In the context of FIG. 29, the term "get" is classified as a copula and hence represents the transition of property attribution (the ring) to Lauri.

FIG. 30 illustrates a second portion of a data structure utilized in accordance with the teachings herein to store a characterization of the sentence of FIG. 28. As a FIG. 27, FIG. 30 is a more token-centric breakdown of the data illustrated in FIG. 29.

Figure 6:
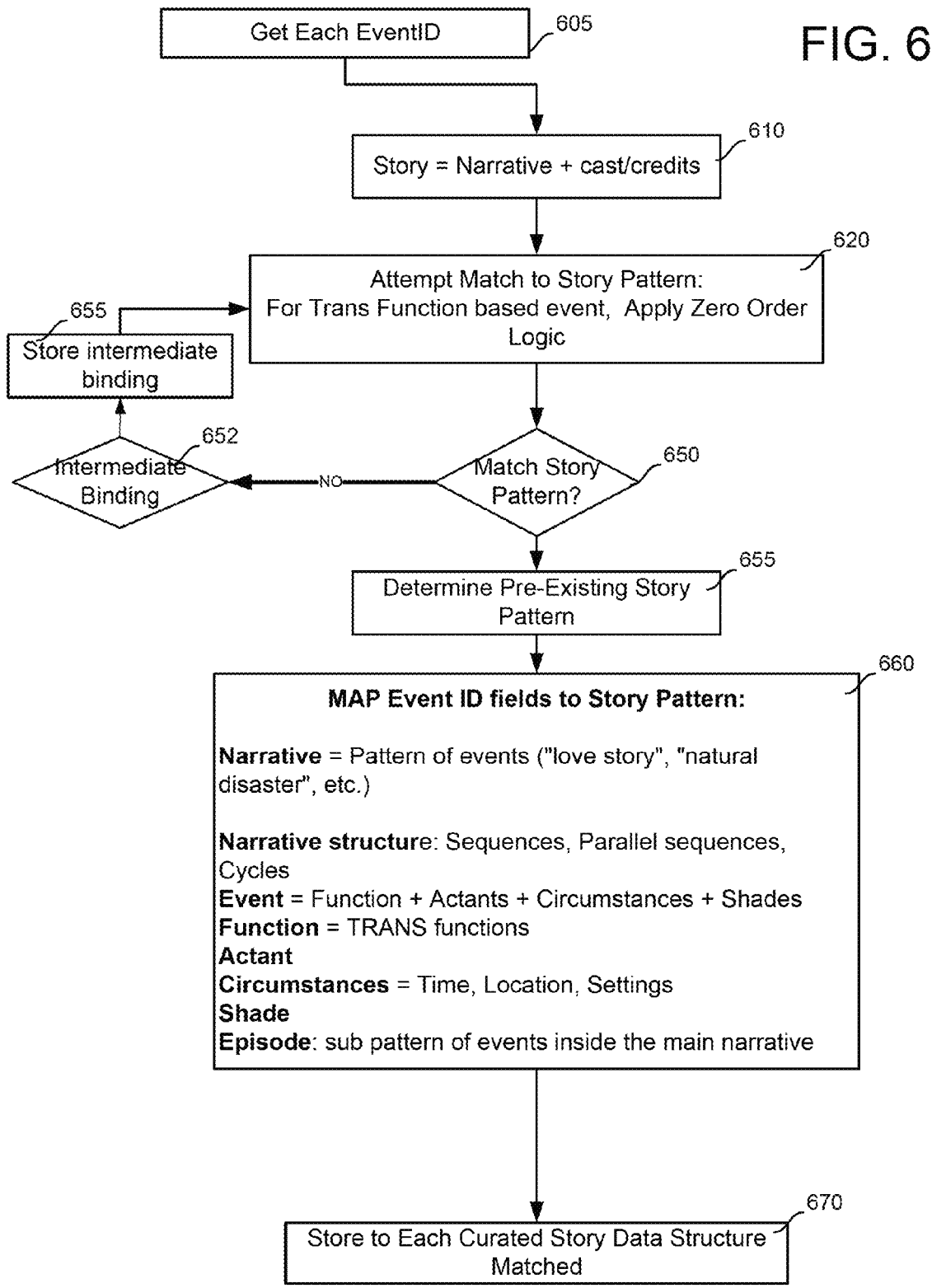
FIG. 6 is a flowchart illustrating a step of mapping events to a narrative.

FIG. 6 illustrates one method for performing step 370 in FIG. 3 to manipulate event records into story analyses by first mapping stories. Again, it should be understood that other analyses of the narrative input data may be performed at step 370 and FIG. 6 illustrates only one type of analysis using the story interpreter 214. At 605, for each event identified by EVENTID, an attempt is made to map the event to a story-based on a story pattern. At 610, each story pattern is retrieved where a story pattern is defined as a narrative and cast/credits. At 620, for each story rule, an attempt is made to match the event to the story pattern, again by first order matching. If there is no pattern match, a determination as to whether an intermediate binding exists at 652 is made and if so the intermediate binding is stored at 655. Once a match is made at 650, a further determination is made at 655 as to whether a pre-existing story mapping exists or whether this is a new story. In either event, the event ID is mapped to the new or existing story pattern at 660. An exemplary story pattern may take the form:

```
Timeline
    [Event_id, Event_id ...]
Narrative
    Name
    List of eventful functions
Cast
    List of eventful actors
```

When performing a story analysis, from event to story, a story interpreter 214 may operate to reorder a textual sequence into a set of threads inside the same narrative. The story rules 240 provide heuristics to identify and reorder the threads an exemplary story rule defined as follows:

[("villain punished", [(villain, abuse, victim), (victim, ask for help), (hero, contract, victim), (hero, punish, villain)]

The system may include thousands of story rules based on implicit story patterns defined for the story interpreter 214. As noted above, each story comprises a narrative and a cast. Each narrative includes pattern of events ("love story", "natural disaster") and has a narrative structure: sequences, parallel sequences, and cycles. As noted above, each event in a story comprises a function, actors, circumstances, and shades. TRANS functions serve as the basis for story analysis. Actors may be characterized in terms of their role within the story, such as, for example, a protagonist, an ally, a villain, a witness, a victim, or the like. Circumstances define, for example, time, location, and settings. Time is important to events as it is used to generate a timeline of events in one of the one of the analysis outputs discussed below. Shades add a descriptive nature to each of the events. Stories may also include sub-stories, or sub-plots, collectively referred to as episodes. Each episode comprises a sub pattern of events inside the main narrative. Some subplots are classified as disruptive, where, for example, they may comprise a "red herring" to the story.

Figure 22:
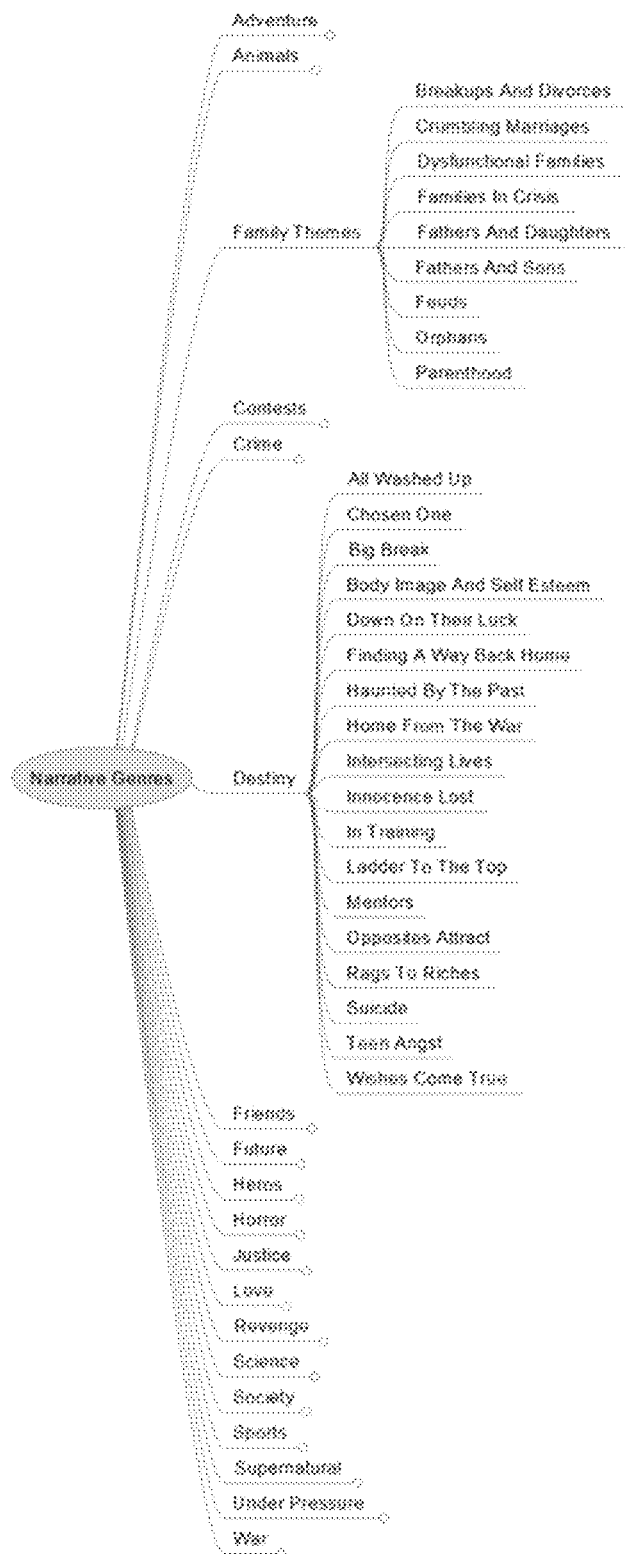
FIG. 22 an illustration of a narrative taxonomy utilized classify stories into particular narrative genres.

At step 650, the story interpreter matches cast and events to story patterns. A story pattern is a sequence of events associated to a thematic name. FIG. 22 illustrates a narrative genre taxonomy which reflects themes which may constitute names of individual stories. For example, one theme is a "rags to riches" story. Each event associates function and a cast of actors. As in the event interpreter, some events are optional. Story rules are sorted and the method follows the same zero order logic as the event interpreter. The story rules leverage the connective patterns identified by the event interpreter, and bindings of individual event IDs are returned. Eventful bindings are returned to the data store 280.

Some events and roles will be generated as probable by entailment rules. For example, the existence of a cadaver implies that there is a killing and some actor is a killer. In creating story timelines, the "protagonist" that is the focus of each thread in a story can be used to trace and to chain events across a timeline, as illustrated in FIGS. 31 and 32. Stories have often two threads for the two lead protagonists, each of them mirroring the other using opposite semiotic square values. The shift of focus on the mirroring thread is often the result of a swap of roles: e.g. the agent becoming the recipient. After each function, each character in cast updates his/her "balance sheet" according to the balance of all deeds and retributions If the story patterns match, then the event ID fields are matched to the story pattern fields, at 660. If not, the method continues at 650 until the story pattern is matched.

The result of the foregoing process is to provide a sequence of story events which in one embodiment may comprise a machine generated story, created from multiple sets of narrative data taken as input. The method may be repeated for any new set of narrative data, thereby allowing dynamic updating of a machine generated story for each new set of narrative data taken as input to the method.

As noted above, each set of events can be utilized to create different types of outputs. FIGS. 31 and 32 represent data structures which can be utilized to create and store timelines.

FIG. 31 illustrates a data structure referencing event data structures and which may be used in the creation of a time line. In FIG. 31, each event, in this case, the events discussed above with respect to FIGS. 25B through 30 are illustrated in the data structure. It will be understood that every sentence in every summary has a similar data structure to that identified in FIGS. 31 and 32 if it is present in a timeline. As illustrated in FIG. 31, for each protagonist, a series of event IDs associated with that protagonist, along with the text of each particular event, and its associated document ID parent (the summary where it resides) is stored in the data structure. Only a portion of the events for protagonist Lauri Waring Peterson are illustrated in FIG. 31. It will be understood that there are any number of events that can be associated with this particular protagonist.

FIG. 32 illustrates a partial data structure storing an event time line for a given character protagonist in a story. The data structure of FIG. 32 illustrates the individual timeline of events for a particular protagonist, in this case protagonist "Vicki" who is another character on the show. Each timeline is a series of events, with each event organized by year, season ID, document ID, episode ID, event ID, and the specific text which is associated with the particular event. The output of a timeline, data structures, such as that shown in FIG. 32 is a sequential, text-based timeline structure which can be output to a display or other document output for consumption by a user. The data structure. FIG. 32 is constructed by the analysis engine 250 discussed above with respect to FIG. 2.

FIG. 33 illustrates a data structure storing data utilized to characterize a protagonist in the context of the technology. Each protagonist in the story can be represented in terms of the data structure for use by the computational engine herein. In the data structure of FIG. 33, the protagonist Lou Knickerbocker is characterized. Lou Knickerbocker is an ex-husband of another character "Tammy" and is identified with a particular object ID, related to a particular show ("series"), and additional information, such as a image of the character, can be stored in the data structure. It will be understood that a data structure similar to that shown in FIG. 33 can be present for every protagonist sought to be tracked in the context of the present technology.

Figure 20:
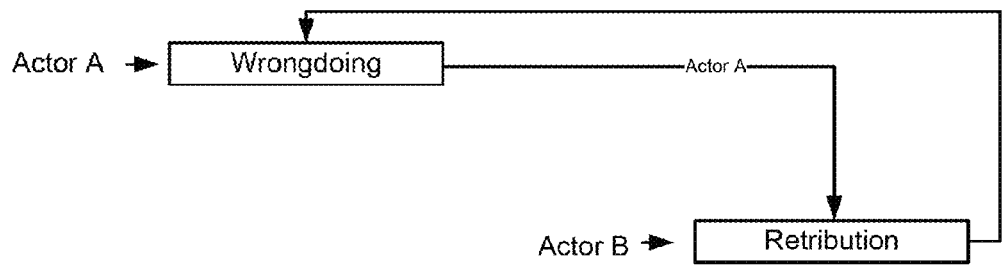
FIG. 20 is an illustration of a narrative balance for an actor in a narrative.

In another unique aspect of the technology, story rules may be predicated on narrative balance, and in particular narrative balance with respect to each actor in a story. FIG. 20 illustrates the concept of narrative balance with respect to actors. In FIG. 20, two actors, actor A and actor be represented as performing respective wrongdoing and retribution actions. If actor A commits wrongdoing against actor B, actor be will likely perform a retribution action against actor A. This balance between transgression and retribution occurs throughout a thematic structure of the story, and can be analyzed relative to each actor in the story.

Two forms of balance found in any narrative are transgression and retribution. If there is a transgression, there will also be a retribution. Between the two negative forms of prohibition and violation, the second one is clearly the most decisive. Any contract will be violated, and any rule will be transgressed. The only counterweight to transgression will be the result of thymic functions, and/or adjustments of degrees of axiological opposition between moral standards.

The semiotic square of functions helps to expand the analysis of the function by exploring opposite, reciprocal and gradual relationships. Typically a retribution can then be chained with the start of a negative transaction: if A attacks B, then the reciprocal expected event is a retribution by B towards A. (FIG. 20) These two sides of the same pattern might be triggered at different times of the same scenario, or be even triggered in different mission or scenario contexts.

Each actor triggers his plan according to his own point of view. In a wrongdoing/retribution pattern, the act object of retribution has only to be considered to be an incitement to a new wrongdoing to obtain a narrative cycle. The two associated sequences then correspond to two complementary points of view of the same action: i.e. redress for the aggressor and wrongdoing for the victim, alternately attributed to the two protagonists, with the wrongdoing becoming a damage to be redressed.

The dynamics of the archetypal narrative works around a double inversion. This canonical sequence chains three phases: opening, core, and closing. The opening of a sequence involves preparation of a resource which is the object that will receive the sequence core, or the object of the sender controlling the sequence. The core of the sequence involves the execution of events and transformations that justify the overall significance given to the sequence (potentially reflected in the name of the sequence). The closing of the sequence which may be actual or virtual, restores the initial state of balance freeze the resources used in the opening of the sequence, replaces protagonists in the environment.

Figure 21:
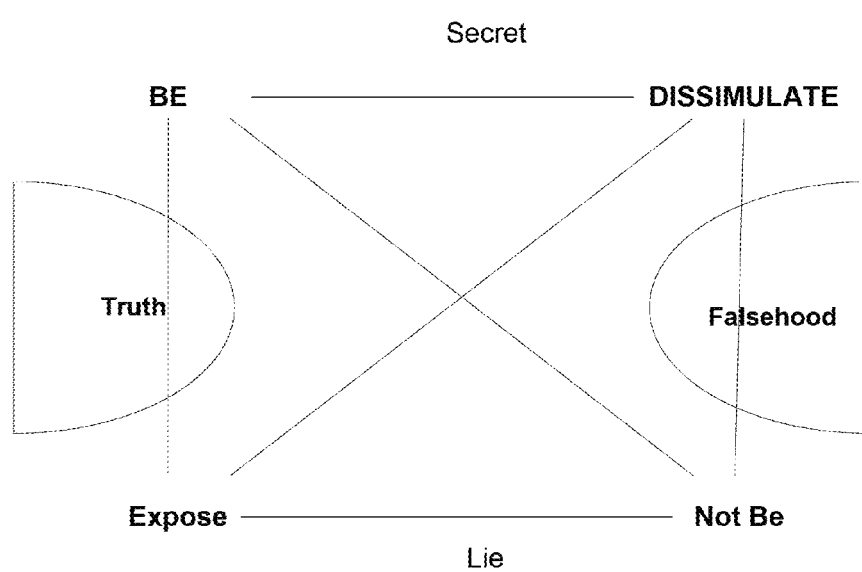
FIG. 21 is an illustration of a semiotic square of an axiological ontology.

An example of an axiological ontology adding another layer of complexity to the contractual square is the articulation of secret and illusion, stemming from a difference of degree between two levels of (recognition of) reality. Access to the ontology of this technology allows one to distort the terms of the contract: keeps the terms secret, lie about the terms, give false commitments, etc. These distortions will be repaid later in the narrative, unmasking the real intents of the protagonists and leading to subsequent plot twists. Thymic and axiological overlays on contractual transactions carry aspectual (occurrence, duration, frequency) and intensity values, both varying over time and circumstances. Again, these inflections will generate emotional shifts and lead to new developments. An axiological ontology can be reflected in the semiotic square such as that illustrated in FIG. 21.

At 380, based on the events mapping, functional mapping, and narrative mapping, an analysis of the story may be created and directed to output 260. In the above, any of a number of different types of outputs 260 can consume the analysis of the story. As noted above, analysis engine 250 may provide a number of analyses to any number of outputs. The analyses include, but are not limited to: generating a timeline of events for a display and/or consumption by a story-based social network; generating a prediction of a next event in a timeline; generating a believability score and generating a comparison of a story to other stories.

Figure 7:
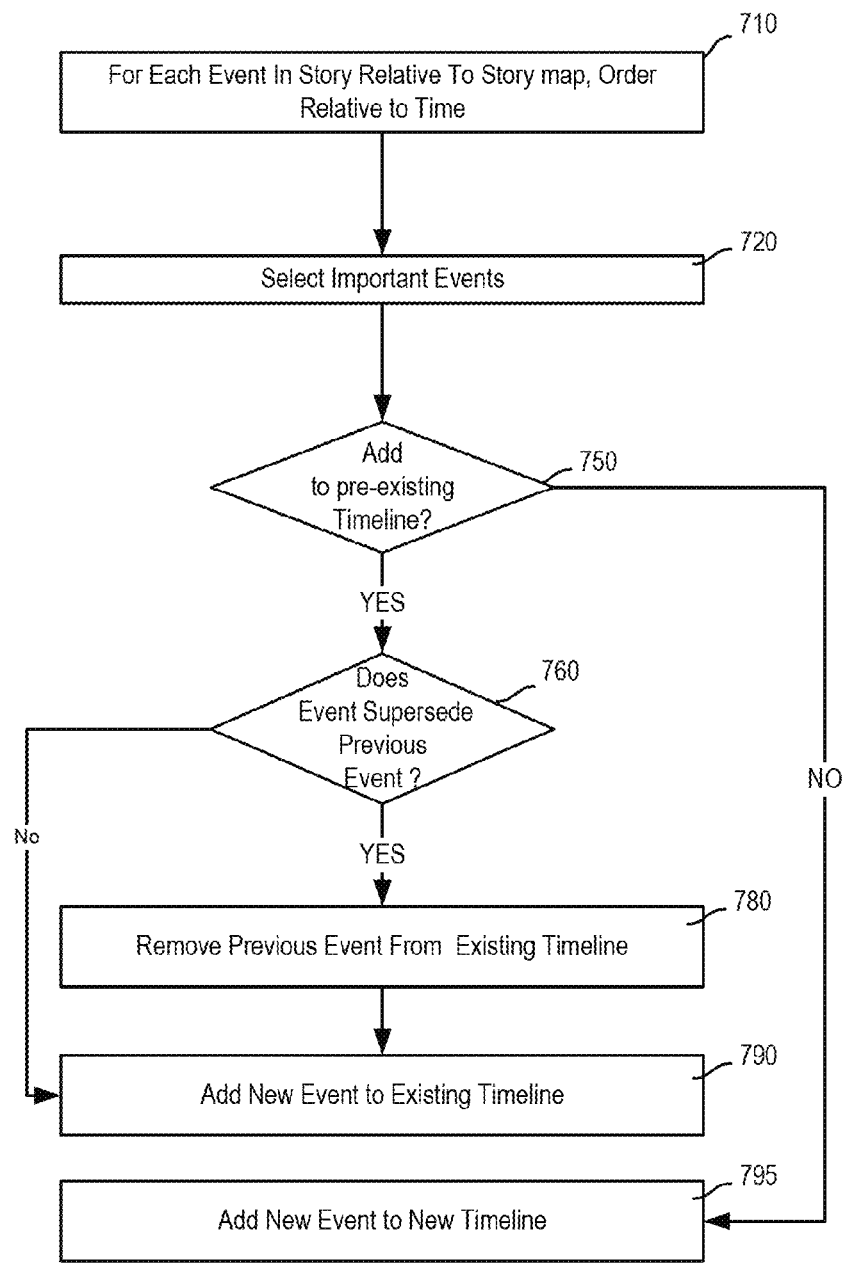
FIG. 7 illustrates a first type of analysis which may be performed on narrative data which includes building a timeline of events for a story.

FIG. 7 illustrates one method for performing at timeline analysis at 370. In FIG. 7, the analysis is to build a timeline of events. A timeline of events may be output to a display device or to another computing environment which consumes the timeline for various purposes. One such computing environment is described below with respect to a story-based social network.

As noted above, each record of an event includes an EVENTID and circumstances including time, and location.

Events have been mapped to story rules, allowing classification of the stories as a series of events. At 710, for each event in a story relative to a story mapping, the event is ordered relative to time in an ordered list. As noted above, protagonists can be utilized to map story threads through the story timeline. At 720, a selection of two or more events may be made. Because stories may have a significant number of events, a timeline may be programmatically limited to a specified number of events, the importance of which can be calculated based on the relative importance of the function, the actor and the objects involved. At 750, a determination is made as to whether any one event is relative to a pre-existing timeline or whether this event is related to a new timeline. If the event is not relevant to a pre-existing timeline then a new event is added to a new timeline at 795. If the sequence can be related to a particular pre-existing story, then a determination is made as to whether not the new event supersedes the previous event at 760. If the event does not supersede a previous event, then the event is added to the timeline at 790. If event does supersede the previous event, then at 780 the previous event is removed from the previous timeline, and the new event added to the previous timeline at 790. If neither 750 nor 760 are true, the event is added to the timeline and the next event is retrieved at 710.

Another type of analysis that may be performed at 370 is story event prediction.

Figure 8:
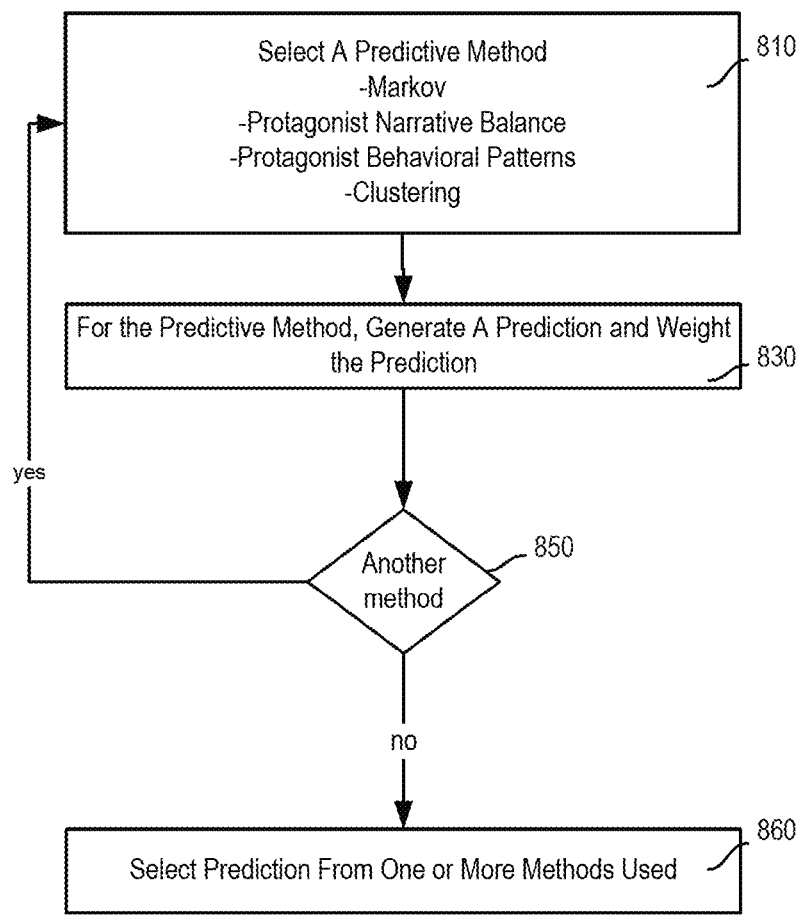
FIG. 8 illustrates a second type of analysis which may be performed on narrative data comprising predicting a next event in the story.

FIG. 8 illustrates one analysis for predicting one or more next events. As used herein, a next event in a narrative may be referred to as a predictive event. Prediction of events may occur using one of a number of different methods. Various alternatives exist for utilizing the different methods. In one embodiment, a single method is used for prediction. In an alternative embodiment, multiple methods are used for prediction, and a selection of the prediction is based on one or more weighting factors relative to the method utilized.

A first predictive method includes analysis of event sequences using a statistical method, such as a Markov chain of events. Within a narrative context, the Markov chain analyzes a sequence of random variables (in this case events) with a property defining a serial dependence only between adjacent portions of the chain. As stories generally follow a chain of linked events, Markov analysis can be applied at the event level (using the semiotic square of elements in the event frame) to determine a predictable next event in a sequence, in this case a story.

A second prediction method is based on narrative balance. The constant narrative balance has been discussed above. For any story, and for any protagonist (in this case the subject of the prediction), a narrative balance analysis evaluates the number of transgressions and retaliations in a given story chain at a given point in the story. Transgressions and retaliations can be determined by, for example, mapping for each TRANS verb an indication of whether the verb identifies an action associated with a transgression or retaliation and identifying event mappings which indicate transgression and retaliation events on a per protagonist basis. Next one determines whether or not the number of transgression events is greater than the number of retaliation events for a given protagonist. If the number of transgression events is greater than the number of retaliation events for a given protagonist, the protagonist is likely the subject of a retaliation event.

This characterization is performed for each protagonist such that there are no "villains" and "heroes"—there are only actors. If one protagonist/actor, on balance, has more transgressions than retaliations relative to another actor, one can predict what the next action relative to each actor will be based on narrative balance. The actor with more transgressions is likely to retaliate against the actor who has committed the transgressions against him/her.

Narrative balance prediction can be further enhanced by seeking shift precursors: protagonists with a negative prequel will looking forward to having positive sequel. This extends the narrative balance prediction methodology to overall story analysis.

Another method for prediction of a next event is to examine protagonist behavioral patterns, learned from similar situations. For any given protagonist in a story, all events involving a given protagonist can be evaluated and examined for semiotic similarities. If an event in a story indicates that an actor will kill when being chased by another actor, a similarity analysis will equate a likelihood of a next action to predict that the same actor will likely kill when being pursued by a different actor, or even that the act of killing can be extended to other elements of the semiotic square defined for the element of "chase."

Returning FIG. 8, at 810, one of the above methods of prediction may be selected. At 830, for each predictive method, a prediction and a predictive weight is generated. The predictive weight is an association of a value with one or more next events resulting from the prediction method used at step 810. For a given event which results from a prediction method, the weight associated with it may be relative to the likelihood the given prediction method attributes to the next event occurrence. Predictive weights can be adjusted by selecting, for any given method, arbitrary values comprising programmer selected assignments for preferences based on the method, or can be programmatically calculated based on past accuracy of the predictive method utilized. For example, one may assign greater weights to protagonist's behavioral patterns than to statistical analyses.

At 850 a determination is made as to whether or not another method should be utilized to create a prediction. In one embodiment, step 850 may be skipped and only one predictive method will be utilized. In another embodiment, all methods can be utilized. The determination 850 may be a programmatic selection configured into the computing environment 200. Once one or more predictions have been made, this prediction is selected at 860.

In another embodiment, each of a number of predictive methods may be performed to provide at least as many predictive events as available methods and may further include performing semiotic substitution on one or more events in the story to produce additional predictive events based on each of the aforementioned methods. In a further embodiment, all such predictions in the form of predictive events are returned to the output.

FIGS. 34 and 35 illustrate example of a data structures utilized in programmatic clustering. Generally, clustering may be performed by determining a frequency of occurrence of each word, POS and token present in a narrative, and grouping associations between terms based on high frequency occurrences of certain terms. Clustering can also be used as a measurement of probability of an association between two events which in turn can be used in the context of prediction and in generating a believability score. In FIG. 34, a first portion 3410 of the data structure maintains a listing of each term, POS and function and the frequency of occurrence thereof in a story. A second portion 3420 maintains a characterization of each word, function or POS by its association to the semiotic ontology. Once frequent terms are identified, a threshold frequency may be applied to remove less frequent terms from analysis, and thereafter links between frequent terms identified based on clusters or groupings of the most frequent terms in a narrative.

In the example of FIG. 34, "disentitle" appears as a TRANSFER or TRANSACTION function six (6) times. (Recall that in certain types of analyses, DO and MAKE functions—also shown in the example of FIG. 34 at 3420—are ignored in this story analysis.) Any of a number of clustering algorithms may be used. In the vector-space model, a text document may be represented by a vector of frequencies of the terms therein. Clustering may be based on the functional ontology, on characters, locations or any classification of terms.

Clustering generally groups a set of objects in such a way that objects in the same group are more similar to each other than to those in other groups. Clustering may be performed by any number of different algorithms. In the present technology, connectivity based clustering may be utilized to determine relationships between events based on a distance measure between the events when organized into a cluster. Any number of different algorithms connect events to form "clusters" based on their distance. At different distances, different clusters will form, which can be represented as a hierarchy of clusters that merge with each other at certain distances.

Connectivity based clustering—based on distance—can be used to generate, for any event, a believability score. The believability score can be created based on the relative distance between two events in a cluster, with one of the events constituting a prototype (cluster center) from which the believability score is measured. The believability score can be added to any predictive analysis as part of an output (timeline or story) to reflect a level of confidence (or believability) in the projection.

For predictability analysis, clustering distances can be used after filtering for threshold distances. Event clusters can be defined as areas of higher density than the remainder of the data set. Objects in these sparse areas—that are required to separate clusters—are usually considered to be noise and border points.

Thus, only events at points within certain distance thresholds or densities may be considered where such events satisfy a density criterion defined as a minimum number of other events within a given cluster radius.

Figure 9:
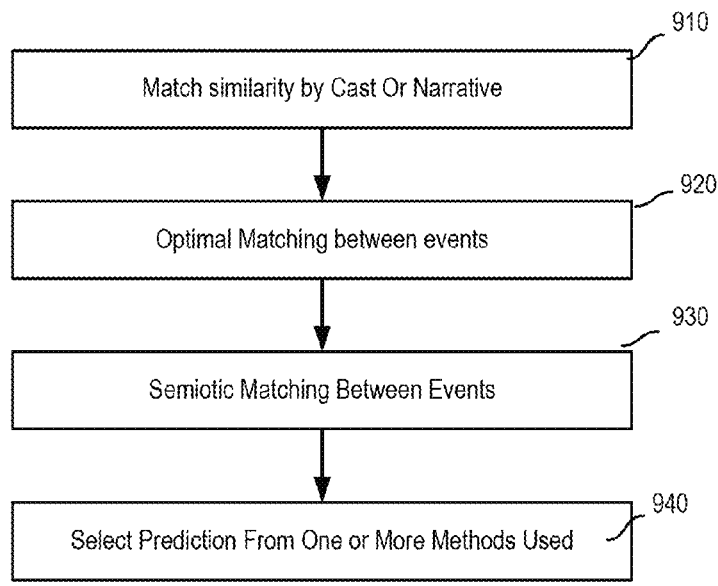
FIG. 9 illustrates a second type of analysis which may be performed on narrative data comprising detecting similarities between the narrative and other narratives.

FIG. 9 is a flowchart illustrating another type of analysis which may be performed once the events have been mapped to a narrative analysis. FIG. 9 is that of detecting similarities between stories which have been mapped to story rules. Although stories may contain different event frames, actors, and circumstances, similarities between the respective stories can be understood based on an extension of the semiotic square analysis.

In FIG. 9, one or more of at least three similarity analyses may be used to detect similarity between two stories. In a first aspect, a taxonomic distance between actors, narratives, or both may be calculated at 910. In a second aspect, optimal matching between events may be calculate at 920. In a third aspect, semiotic matching between events in respective stories may be used at 930. One or more of the resulting similarity calculations may then be selected at 940 based on the application for which the similarity calculation is used.

At 910, predicting story similarity may be based on abstracting the story structure based on the aforementioned story rules, and for each element in the story rule, determining taxonomical distance between that element and another element a respective taxonomy. Two stories may be considered similar if their narratives and/or cast are similar. Narrative similarity may be a combination of: distance in narratives taxonomy and optimal matching between events in narratives. Cast similarity is a function of a distance in an actors taxonomy.

Figure 23:
FIG. 23 is an illustration of a characters or actors taxonomy utilized to characterize actors within a particular story.

A number of different taxonomies may be provided to classify different types of topics in a story. FIG. 22 shows a topics taxonomy which may be utilized by the technology to classify topics of stories into a relationship. Other types of taxonomies utilized by the technology include, for example, a settings taxonomy, and actor taxonomy (illustrated with respect to FIG. 23), and a taxonomy of narrative genres (FIG. 22). Taxonomies are used to classify and specify relationships between each of the various subjects of the taxonomies. Illustrated herein are the narrative genre taxonomy (FIG. 22) and the actors taxonomy (FIG. 23). However it is to be understood that any number of different taxonomies may be utilized in accordance with the present technology. The particular relationships in the taxonomy may be programmed into one or more data structures having a form similar to that shown in FIGS. 11 through 18.

To compute similarities between a given narrative and other narratives, in a first embodiment, a linear distance between the respective elements in a narrative to other elements in the narrative being compared thereto. In one embodiment, this may be the linear calculation of a distance between two elements in a given taxonomy. For example, if a story has been classified as a destiny genre (illustrated in FIG. 22) and specifically a "big break" genre, and another story is classified as a destiny genre and a "rags to riches" story, each of these two items in the destiny genre can be said to be related by a linear distance of 1. However the linear distance from a "family" theme of "breakups and divorces" the "big break" genre would be much greater e.g. a linear distance of four nodes.

A second methodology which may be used alone or in combination with the linear distance calculation is that of an optimal matching at 920. Optimal matching attempts to provide, for each of the elements in the narrative, a determination of the relationship to a corresponding element and another narrative. Optimal matching is a sequence analysis method to assess the dissimilarity of ordered arrays of tokens (herein, events,) that usually represent a time-ordered sequence of states. Once such distances have been calculated for a set of observations (e.g. individuals in a cohort) classical tools (such as cluster analysis) can be used. OMA is a family of procedures that takes into account the full complexity of sequence data. The objective is to identify a typology of sequences empirically. The core of OMA is a two-step procedure. First, given a set of sequences, find the distance between every pair of sequences though an iterative minimization procedure. This will give a distance matrix for all the sequences. Secondly, apply clustering or cognate procedures to the distance matrix to ascertain if the sequences fall into distinct types. The objective of this first step is to find, for each pair of sequences in the sample, the lowest 'costs' needed to turn one sequence into another, using three elementary operations: insertion, deletion, and substitution—such as substitution using the semiotic square defined herein.

Utilizing the ontology discussed herein, as well as the semiotic square of each element in a narrative, one can compute the number of similar elements, narrative by narrative, and determine an optimal matching value for each event. Optimal matching between two different narratives can produced an optimal matching value score, and the score may be compared with the taxonomical value distance, or combined with the taxonomic value distance, to achieve a similarity score between two different narratives. Multiple narratives can be compared and ranked based on this similarity score. In another aspect, if a user promotes a particular story as being similar to another story, this can be factored into the similarity index.

Figure 10:
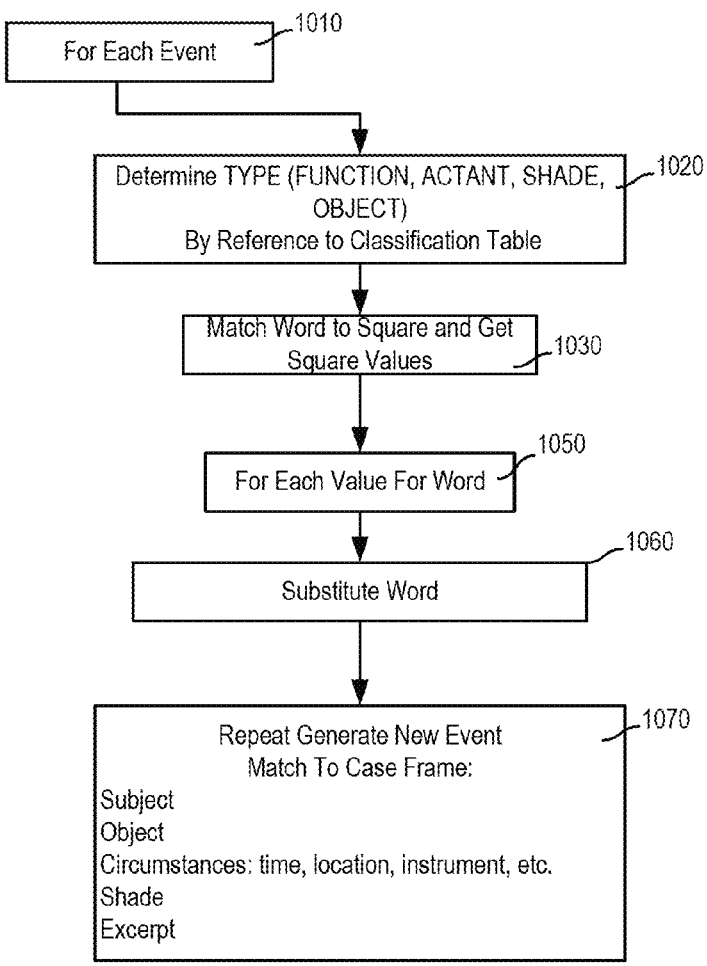
FIG. 10 is a flowchart illustrating a computer in the process for implementing a semiotic square substitution for components of cases, events and stories, which may be utilized in any of the analyses discussed herein.

At various points in the aforementioned disclosure, discussion of using the semiotic square substitution has been described. FIG. 10 is a flowchart illustrating a computer implemented process for implementing a semiotic square substitution for any of the aforementioned processes of substitutional analysis.

Semiotic square substitution at 930 for each of a number of moments in a narrative can be utilized at multiple levels in the context of the present technology. FIG. 10 illustrates a method for performing semiotic square substitution and evaluation of, for example, case frames. For each event at 1010, and for a selected number of events, at least one of the elements within the particular case frame (function, actor, shape, or object) may be evaluated relative to a semiotic square. At 1030, the semiotic square for the particular element (the word associated with particular function, actor, shape, or object) is returned, and for each value for each word in the square at 1050, (or for a subset of elements in square,) square values for each element under evaluation may be substituted (at 1060) into the case frame to generate a new event at 1070. The new event can then later be used to perform any of the evaluations discussed herein. For example, substituting a SPNA value for an SPA value will result in oppositional element in a particular story. The same event can then be passed through the story mapping, timeline analysis, prediction analysis, or similarity analysis to determine a result based on the substituted value. For example, instead of a hero being victorious, a villain can be victorious. The substitution will impact the similarity or dissimilarity determination for a particular narrative. The substitution may be repeated at 1060 each word in the semiotic square, and any of the values in the case frame.

Any one or more of the above methods 910, 920, 930 may be used and a determination made at 940 to select the similarity result of the calculation.

Figure 24:
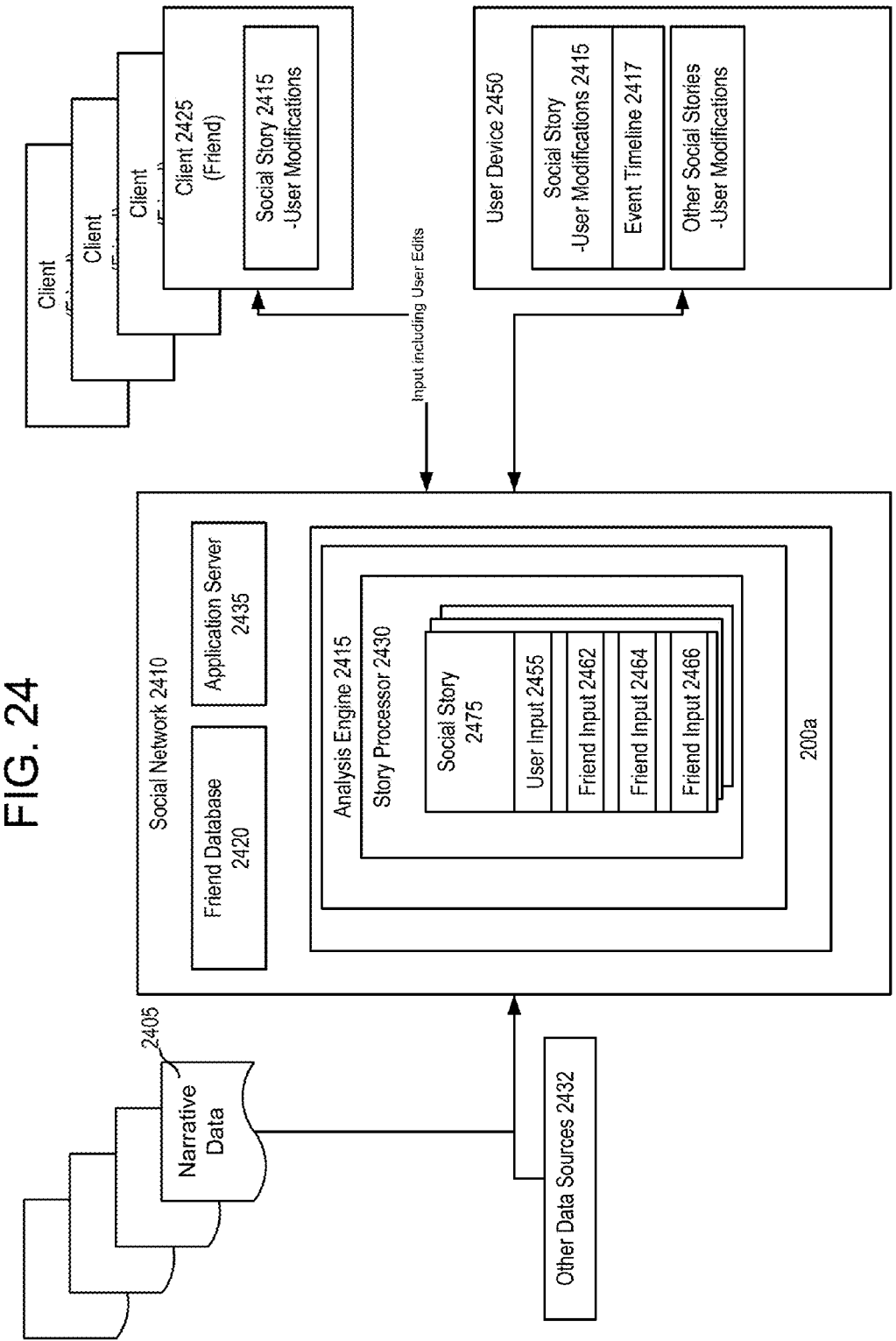
FIG. 24 is an illustration of a computing system environment suitable for moving a story-based social network. In accordance with the present technology.

FIG. 24 is an illustration of a computing system environment suitable for providing a story-based social network in accordance with the present technology.

FIG. 24 illustrates a computing environment which may be implemented as an output 260 for the computing environment of FIG. 2. The computing environment comprises a social network computing environment 2410. The social network computing environment 2410 may include therein a processing computing environment 200*a* which will be understood to be similar to computing environment 200, including all the elements thereof. For purposes of brevity, only the analysis engine portion of computing environment 200 is illustrated as analysis engine 2415. Analysis engine 2415 may operate to perform any of the analyses discussed herein. Social network computing environment 2410 can include one or more processing environments 200*a*.

Social network computing environment 2410 includes a friend database 2420, application server 2435 and one or more analysis engines 2415. Each analysis engine includes a story processor creating a curated story in accordance with the description herein. The story processor takes as input sets of narrative data 2405 which comprises text inputs which are provided to the story generator. In addition, other data sources 2432 can provide data to the analysis engine and story processor. Other data sources may include, for example, social networks such as Twitter and Facebook, weblogs or "blogs", commercial new sources such as CNN and MSNBC, or any electronically available narrative data source which may be accessed directly or indirectly using programmatic means. In a further embodiment, the sets of narrative data 2405 may be user-selected. In one embodiment, an interface presenting a set of narrative data encompassing a variety of different input stories (such as news articles) is provided to a user of social network computing environment 2410 via user device 2450. The computing environment 2410 receives a user-selection of one or more input stories as input sets of narrative data 2405, and the analysis is performed based on the user-selected set of input data.

One or more client devices 2425 may be coupled to the social network computing device 2410 via one or more public or private networks, such as the Internet. Likewise, a user device 2450 may also be coupled to the social network computing environment 2410 via one or more public and private networks. Each user device 2450 and client device 2425 may be a separate processing device, or may be considered an application executing on a processing device which provides access to the output of the social network computing environment 2410. An example of such an application would be a rub browser, or application server 2435 outputs a webpage to the client device 2425 or user device 2450.

As illustrated in FIG. 24, analysis engine 2415 creates, within a story processor 2430, a social story 2475. Social story 2475 may be a combination of a narrative timeline for a news or current event, or a popular television narrative, which includes excerpts from the narrative data, all of which map to a particular story in accordance with the teachings herein. The story processor can be configured to receive user input 2455 provided by the user device 2450. For any given story, and any user of the social network, the social story may be provided to a user device 2450. Upon review of the social story at the user device 2450, a user may select friends from the friend database 2420 with whom to share and discuss the social story. A friend database 2420 allows a user to control which users friends will be connected to a social story, the social story thus being output to those users in a social relationship with each other. A user may provide user modification to the social story prior to sharing the social story with user's friends. Once social story including user modifications is provided to client devices 2425, users of the client devices may provide their own user edits to the social story. The result is a social story 2475 with user input 2455, and various elements of friend input 2462, 2464, and 2466. The resulting user and friend modified social story is then output to all devices 2450 and 2425, enabling users to interact with the user social story in the social network computing environment 2410. This process can be repeated and updated for each element of friend input and user input to the social story.

As illustrated on user device 2450, a user device may include user modifications, an event timeline, and friend input is further illustrated in FIG. 24, multiple curate stories may be created by the story processor 2430 and any number of social stories access by user device 2450 client devices 2425. User device 2450 may comprise a personal computer, mobile computer, mobile phone, tablet, or other suitable processing device. Application server 2345 may be a web application server adapted to deliver elements of the social story and user input to user device 2450 as client devices 2425, or may provide dedicated applications and accompanying data to user device 2450.

FIG. 36 is an illustration of an exemplary computing system suitable for implementing in the computing systems discussed herein. As illustrated in FIG. 36, the computing system 3702 includes a processor 3710. A processor 3710 for computing system 3702 is configured to execute software instructions in order to perform functions as described in the various embodiments herein. A processor 3710 for a computing system 3702 may be a general purpose processor or may be part of an application specific integrated circuit (ASIC). A processor 3710 for a computing system 3702 may also be a microprocessor, a microcomputer, a processor chip, a controller, a microcontroller, a digital signal processor (DSP), a state machine, or a programmable logic device. A processor 3710 for a computing system 3702 may also be a logical circuit, including a programmable gate array (PGA) such as a field programmable gate array (FPGA), or another type of circuit that includes discrete gate and/or transistor logic. A processor 3710 for a computing system 3702 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computing system 3702 includes a RAM 3720 and a non-volatile storage 3730 that can communicate with each, and processor 3710, other via a bus 3708. Illustrated in the non-volatile storage 3730 are components including a parser, analysis engine, event interpreter and story interpreter as discussed herein.

As shown, the computing system 3702 may further include a display unit 3750, such as a liquid crystal display (LCD), an organic light emitting diode (OLED), a flat panel display, a solid state display, or a cathode ray tube (CRT). Additionally, the imaging processor may include an input device 3760, such as a keyboard/virtual keyboard or touch-sensitive input screen or speech input with speech recognition, and which may include a cursor control device, such as a mouse or touch-sensitive input screen or pad. A network interface 3740 may be a wired or wireless network interface allowing the system 3702 to communicate with other devices in the manner discussed herein, via public, private, wireless and wired networks.

In the embodiment illustrated in FIG. 36, the data store is illustrated in FIG. 2 are shown, as well as elements comprising code stored in nonvolatile storage, which may be executed by the processor 3710 to create a parser 205a. An analysis engine 250a, event interpreter 212a, and the story interpreter 214a, such code when implemented by the processor 3710 creating the parser 205, analysis engine 250, event interpreter 212, and story interpreter 214.

Memories described herein are tangible storage mediums that can store data and executable instructions, and are non-transitory during the time instructions are stored therein. A memory described herein is an article of manufacture and/or machine component. Memories will described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A machine implemented method, comprising;
    accessing narrative data, the narrative data comprising a plurality of sequence of words, each sequence of words including a verb and being arranged in a sentence pattern;
    reading a semiotic square function data table for each verb in the sequence of words, each semiotic square function data table classifies at least one verb in each sentence pattern as a functional type and includes one or more words in a semiotic square relationship to the verb classified, the functional type applying a symmetrical relationship between a first actor and a second actor in the narrative data;
    accessing a set of event rules, each event rule containing an association of a verb and functional type to an event record;
    parsing each sentence which includes a verb matching a functional type to match sentence subjects and objects to an event rule selected from the set of event rules;
    storing data from each subject and object in a sentence as an event record; and
    displaying an analysis of the narrative data on a user perceptible device to a user relative to a common story theme based on a sequence of event records.

2. The machine implemented method of claim 1, wherein the semiotic square function data table includes a MAKE function type, a TRANSFORMATION type, a TRANSFER type, and a TRANSACTION type.

3. The machine implemented method of claim 2, wherein the analysis ignores the MAKE function type and TRANSFORMATION function type.

4. The machine implemented method of claim 1, wherein the analysis includes a timeline of time-ordered event data.

5. The machine implemented method of claim 1, wherein the analysis includes displaying a sequence of events comprising a story narrative, the story narrative comprising the sequence of event records.

6. The machine implemented method of claim 1, wherein the analysis includes reading a semiotic square subject and object data table and swapping data in the event records for subject and objects the semiotic square subject and object data table.

7. The machine implemented method of claim 1, wherein the parsing maps narrative data to a case frame including: a subject, an object, circumstances, shades, and an excerpt, the parsing creates a case frame record for each mapping.

8. The machine implemented method of claim 7, wherein the parsing maps case frame records to event frames.

9. The machine implemented method of claim 8, wherein the semiotic square function data table includes a DO type, a TRANSFORMATION type, a TRANSFER type, and a TRANSACTION type, each function type having a different event frame type.

10. A computer implemented method of analyzing a story in text to produce an output, comprising:
    parsing the text to produce a list of words, ones of the words comprising nouns and verbs, the parsing producing a sentence structure;
    reading a function classification table, the function classification table storing ones of the verbs with a definition of each verb as one of a DO function type, a TRANSFORMATION type, a TRANSFER type, and a TRANSACTION type;
    reading, for at least each verb, a semiotic square data table;
    accessing a set of event rules, each event rule containing an association of a verb and functional classification to an event record, each event record mapping events to event frames, each event frame configured based on a verb being classified as the DO type, the TRANSFORMATION type, the TRANSFER type, and the TRANSACTION type;
    generating event records including ones of the words from the sentence structure;
    storing the event records; and
    displaying an analysis of the events including at least an ordering of the events on a user perceptible device to a user.

11. The computer implemented method of claim 10, wherein the analysis includes displaying a sequence of events comprising a story narrative, the story narrative comprising a sequence of event records.

12. The computer implemented method of claim 11, wherein the analysis includes reading a semiotic square subject and object data table and swapping data in the event records for subjects and objects from the semiotic square subject and object data table.

13. The computer implemented method of claim 10, wherein the parsing maps narrative data to a case frame includes a frame comprising: a subject, an object, circumstances, shades, and an excerpt, the parsing creates a case frame record for each mapping.

14. The computer implemented method of claim 13, wherein parsing the text maps case frame records to event frames, the parsing ignores the Do type and the TRANSFORMATION type.

15. The computer implemented method of claim 14, wherein the function classification data table includes the DO function type, the TRANSFORMATION type, the TRANSFER type, and the TRANSACTION type, each function type having a different event frame type.

16. A computing system adapted to analyze narrative textual data, the computing system includes a processor and a storage medium, comprising:
    a data structure stored in the storage medium including a classification table, the classification table includes a plurality of verbs classified as functional types, at least one functional type characterizes a relationship between a first actor and a second actor in the narrative textual data, the classification table includes at least one semiotic square term for each of the plurality of verbs;
    the computer system including the processor and the storage medium and a plurality of lines of code that is configured to:
    collect electronic textual narrative data documents;
    read a classification data structure, the data structure includes classifications of verbs as functional types, the classification data structure includes one or more words in a semiotic square relationship to the verb classified, the classification data structure includes classifications of at least one verb in each sentence pattern as a functional type, at least one functional type applying a symmetrical relationship between a first actor and a second actor in the narrative data;
    access a set of event rules, each event rule containing an association of a verb and functional type to an event record;
    parse each sentence which includes a verb matching a functional type to match sentence subjects and objects to an event rule selected from the set of event rules;
    store data from each subject and object in a sentence as an event record;
    analyze the narrative data relative to a common story theme based on a sequence of event records and output an analysis result; and
    display the analysis of the narrative data to a user using a user perceptible device.

17. The computing system of claim 16, wherein the computer system is further configured to display a timeline of time-ordered event data, collect textual data including a later event in the sequence of events and update the timeline with the later event in the time-ordered event data.

18. The computing system of claim 17, wherein the data structure includes functional types comprising at least a DO function type, a TRANSFORMATION type, a TRANSFER type, and a TRANSACTION type.

19. The computing system of claim 17 further including a semiotic square data structure for subjects and objects in narrative data documents, the computer system is further configured to swap data in event records for subjects and objects from a semiotic square data table.

20. The computing system of claim 16, wherein the computer system is further configured to collect a user-selected set of textual narrative data document and output a social story including a selected sequence of events to a selected set of processing devices based on a defined social relationship.

* * * * *